United States Patent

Verrall et al.

[19]

[11] Patent Number: 6,099,758
[45] Date of Patent: Aug. 8, 2000

[54] BROADBAND REFLECTIVE POLARIZER

[75] Inventors: Mark Verrall; Kim Slaney; John Philip Argent; David Coates, all of Dorset, United Kingdom

[73] Assignee: Merck Patent Gesellschaft mit beschrankter Haftung, Germany

[21] Appl. No.: 09/153,997

[22] Filed: Sep. 16, 1998

[30] Foreign Application Priority Data

Sep. 17, 1997 [EP] European Pat. Off. ............. 97116151

[51] Int. Cl.[7] ............................. F21V 9/14; C09K 19/52; G02F 1/1335
[52] U.S. Cl. ........................ 252/585; 252/299.01; 349/96
[58] Field of Search .............................. 252/585, 299.01; 349/96

[56] References Cited

U.S. PATENT DOCUMENTS

| | | | |
|---|---|---|---|
| 4,456,638 | 6/1984 | Petcavich et al. | 428/1 |
| 5,506,704 | 4/1996 | Broer et al. | 359/63 |
| 5,691,789 | 11/1997 | Li et al. | 349/98 |
| 5,751,388 | 5/1998 | Larson | 349/96 |
| 5,793,456 | 8/1998 | Broer et al. | 349/98 |
| 5,828,488 | 10/1998 | Ouderkirk et al. | 359/487 |
| 5,867,239 | 2/1999 | Sahouani et al. | 349/117 |
| 5,899,551 | 5/1999 | Neijzen et al. | 349/115 |
| 5,948,831 | 9/1999 | Broer et al. | 522/182 |

*Primary Examiner*—C. H. Kelly
*Attorney, Agent, or Firm*—Millen, White, Zelano & Branigan, P.C.

[57] ABSTRACT

The invention relates to a broadband reflective polarizer that comprises a layer of a polymerized mesogenic material exhibiting a helically twisted molecular structure with planar alignment, said reflective polarizer being obtainable by a process wherein a mixture of a chiral polymerizable mesogenic material comprising a) at least one achiral polymerizable mesogenic compound, b) at least one chiral compound that can in addition be polymerizable and/or mesogenic, c) a polymerization initiator, is coated on a substrate or between two substrates in form of a layer, aligned in a planar orientation so that the axis of the molecular helix extends transversely to the layer, and polymerized by exposure to heat or actinic radiation, and optionally the substrates are removed from the polymerized material, characterized in that said polymerizable material is coated and polymerized between two different substrates, and/or at least one of said substrates comprises a barrier layer on the surface adjacent to the layer of said polymerizable material, to a process of preparing such a broadband reflective polarizer and to a liquid crystal display comprising such a broadband reflective polarizer

11 Claims, 8 Drawing Sheets

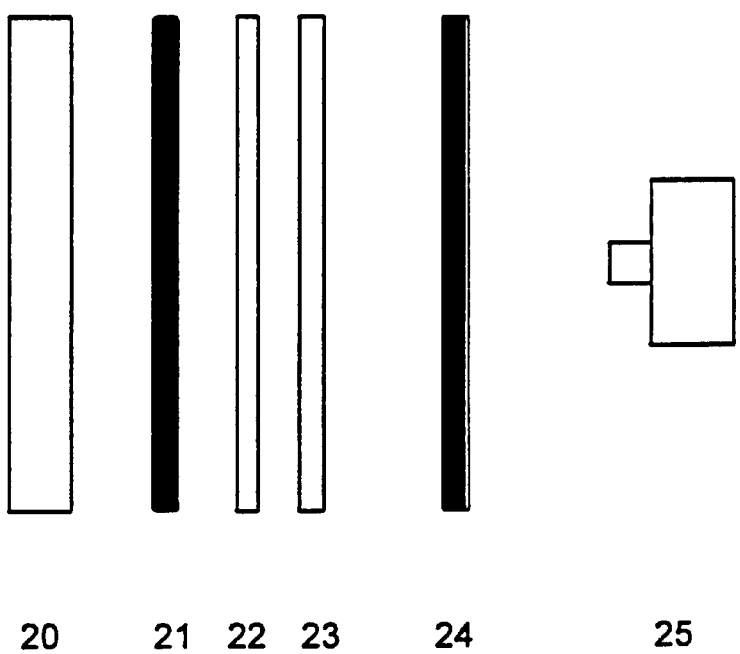
20  21 22 23   24         25
FIG. 2.1
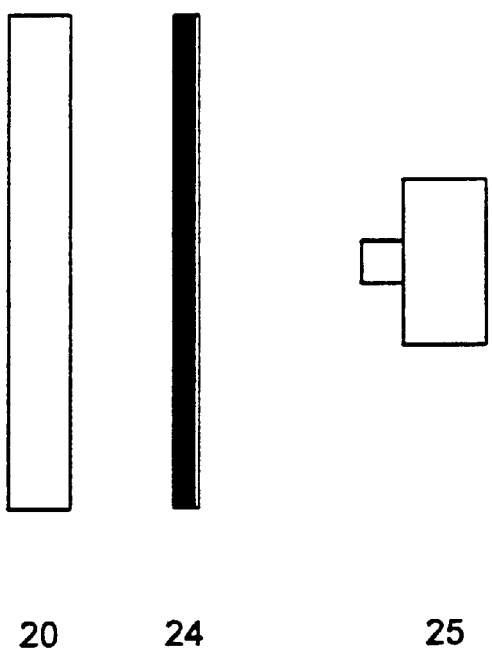
20      24        25
FIG. 2.2

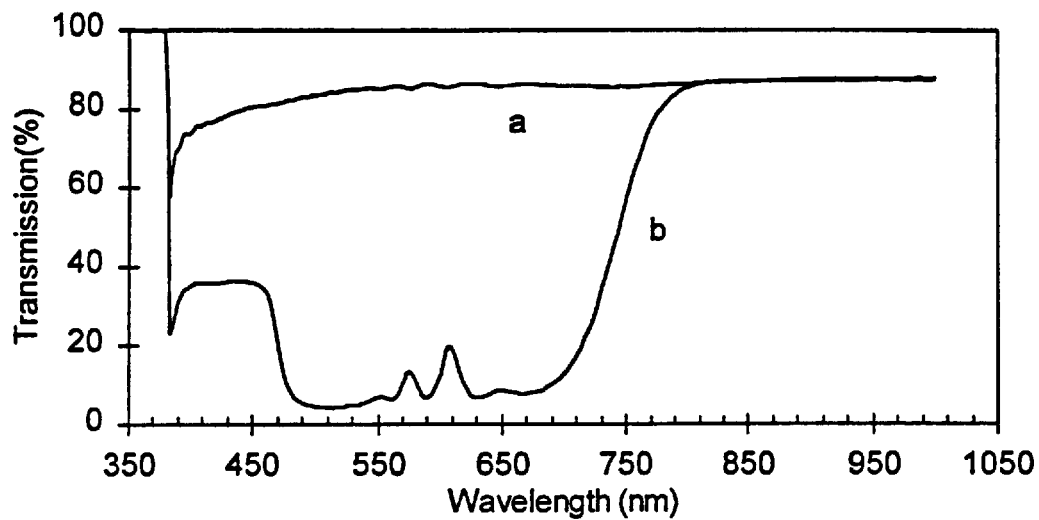
FIG. 3.1
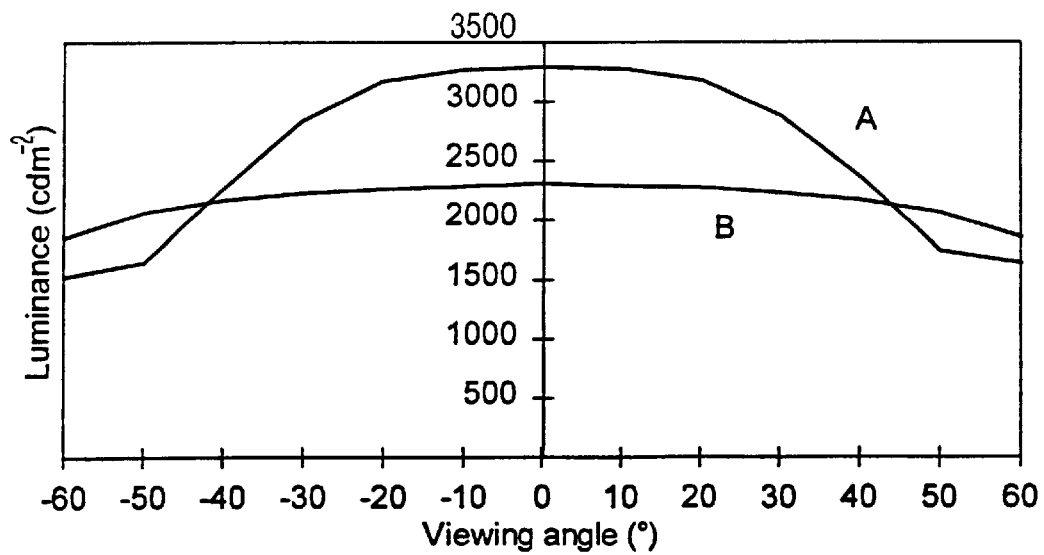
FIG. 3.2

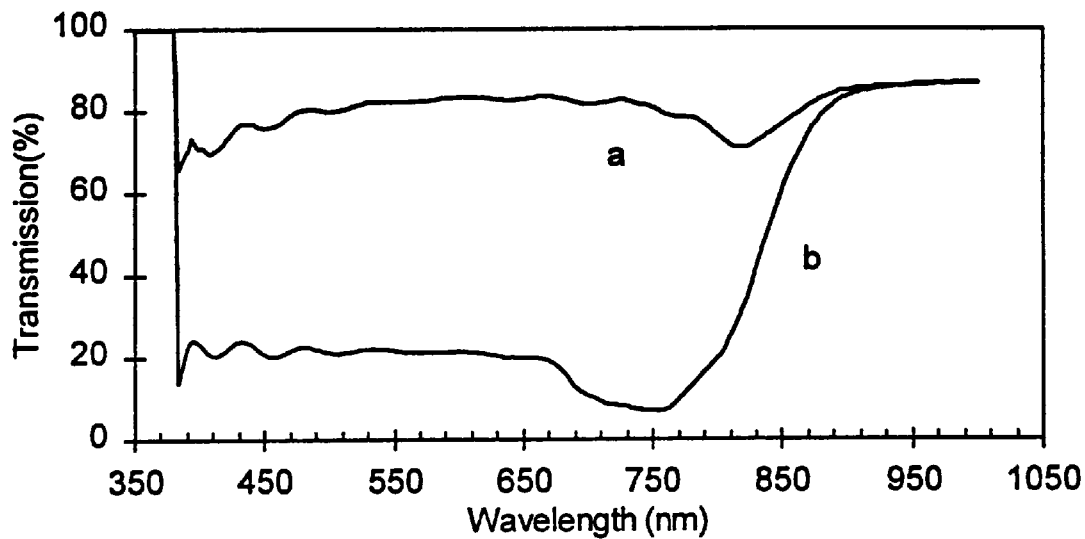
FIG. 4.1
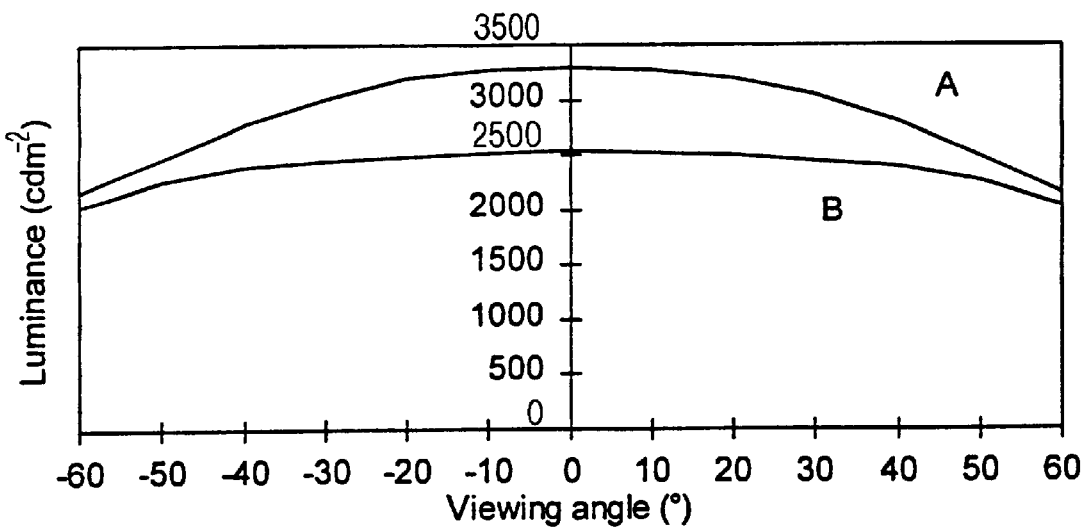
FIG. 4.2

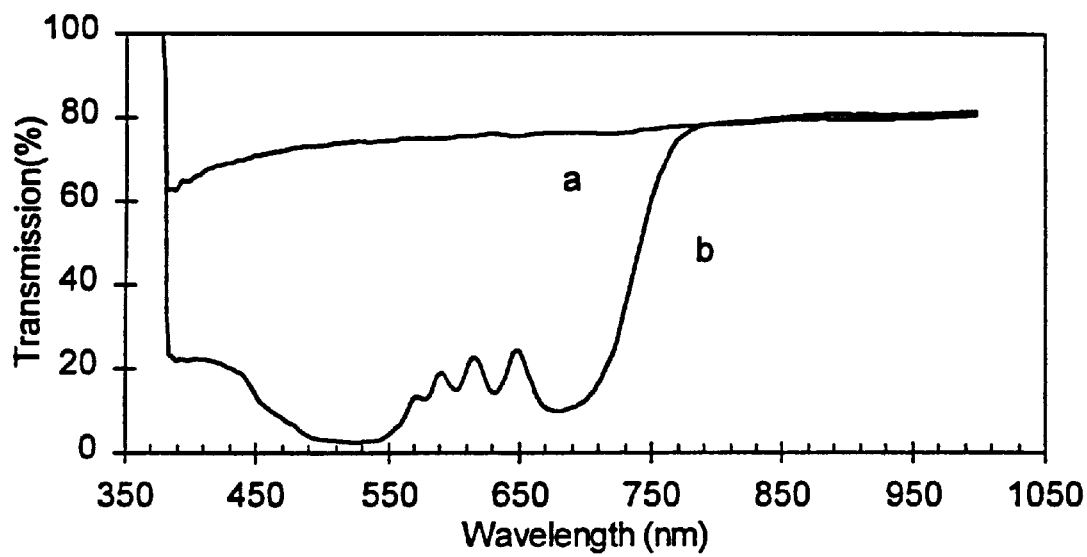
FIG. 5.1
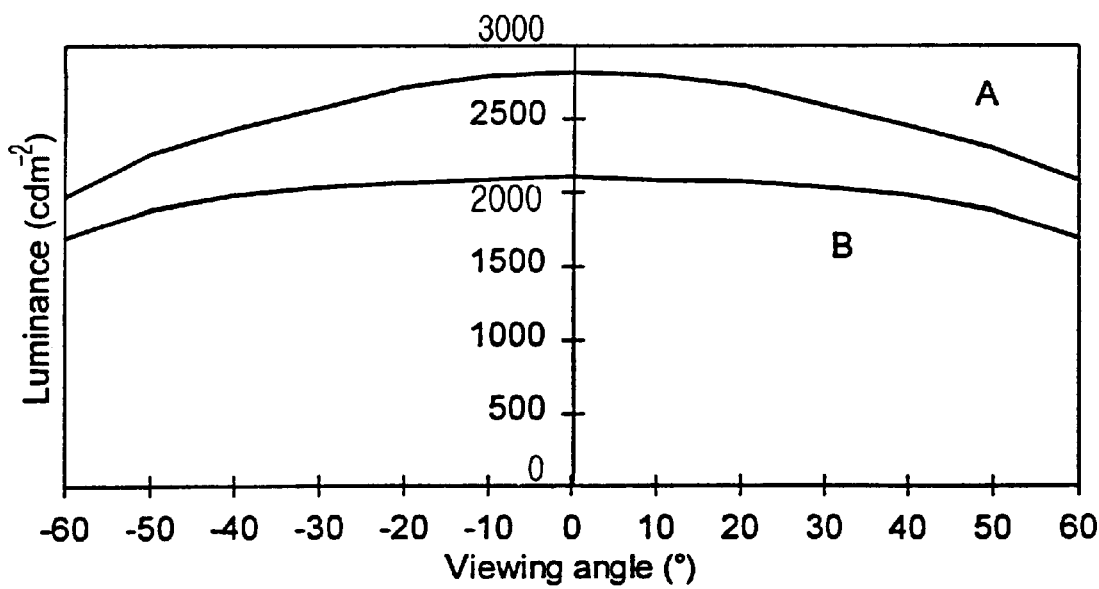
FIG. 5.2

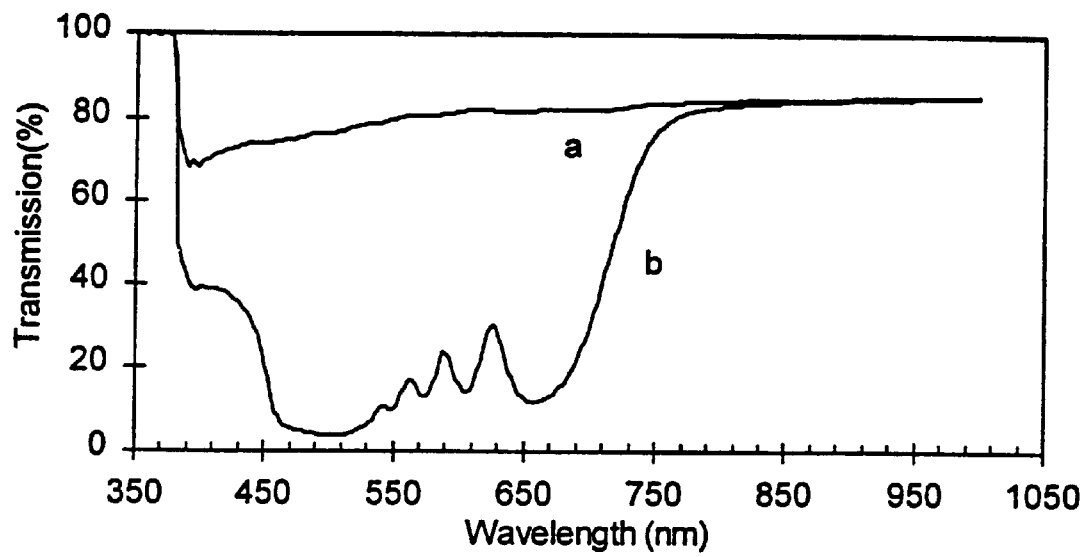
FIG. 6.1
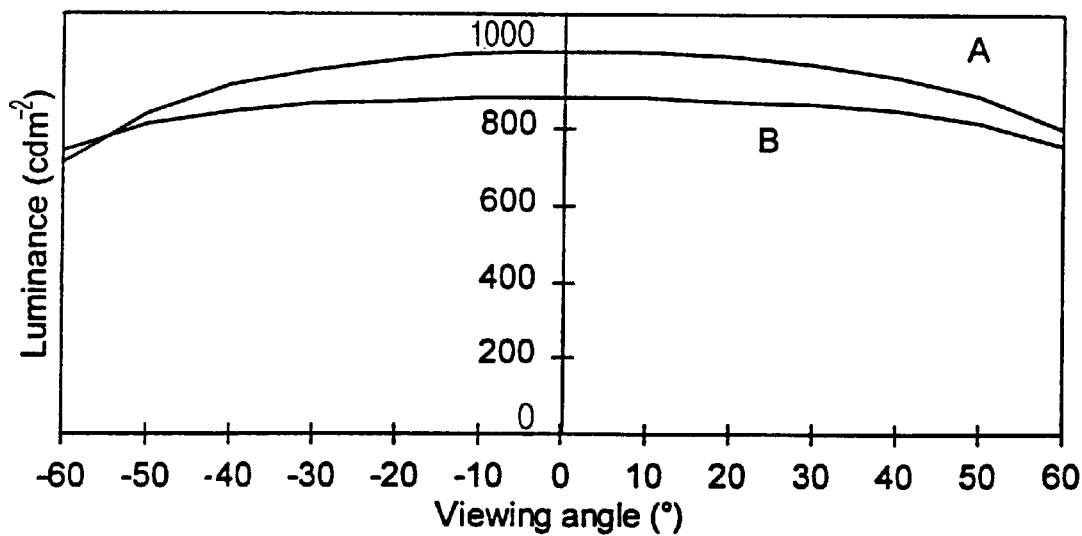
FIG. 6.2

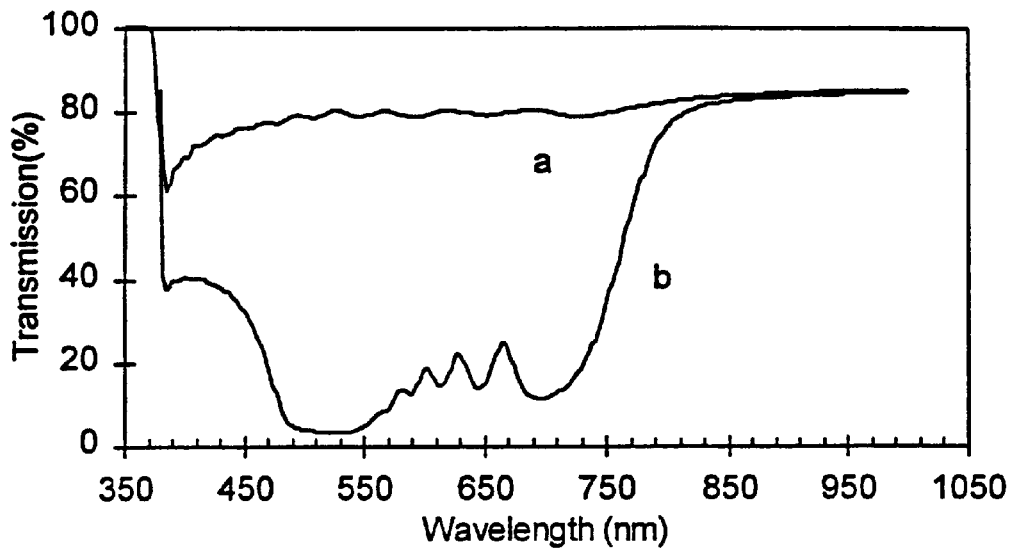
FIG. 7.1
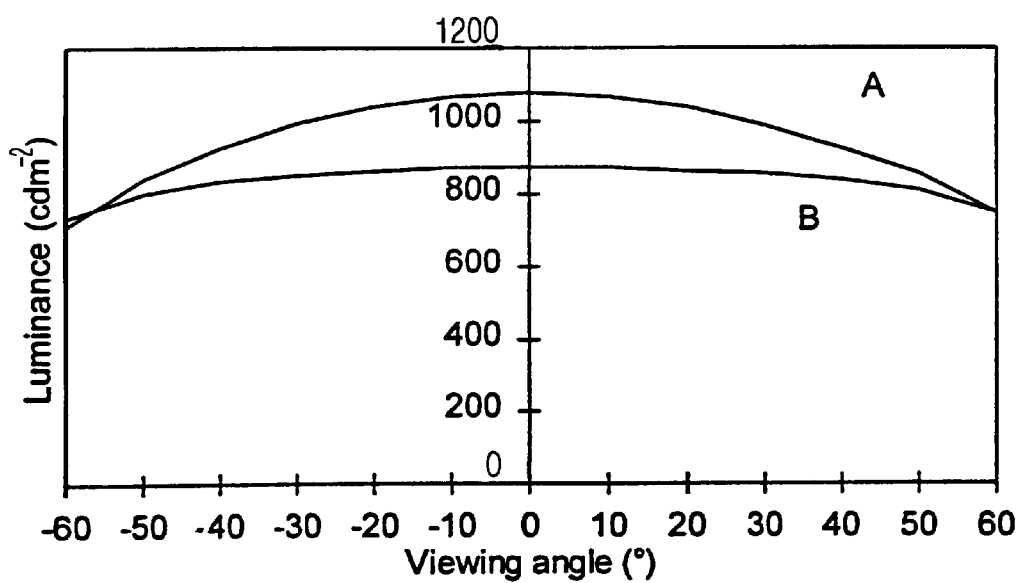
FIG. 7.2

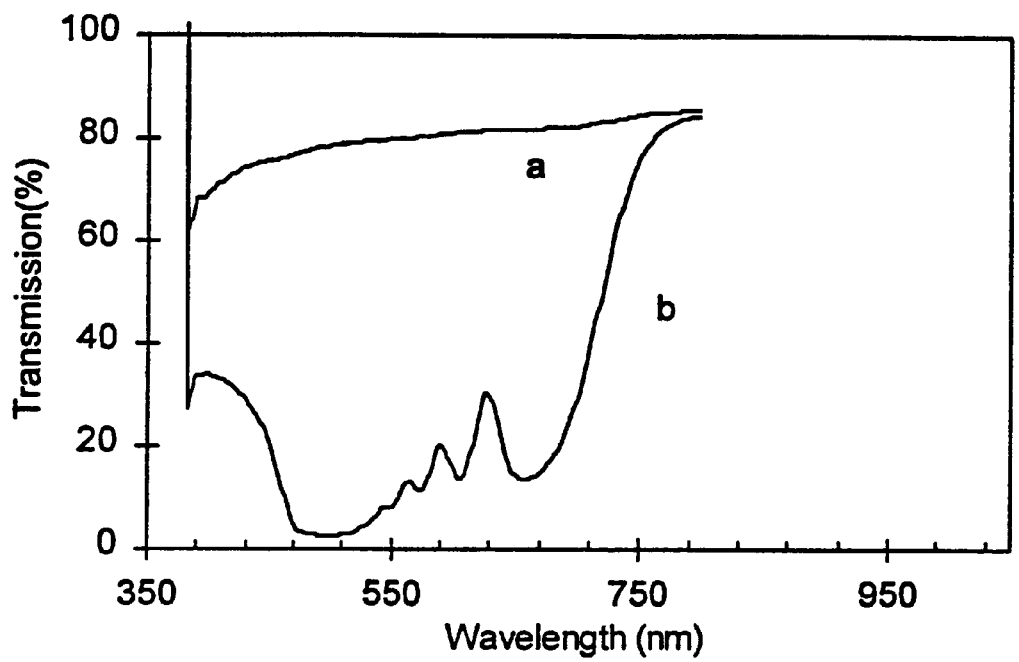
FIG. 8.1
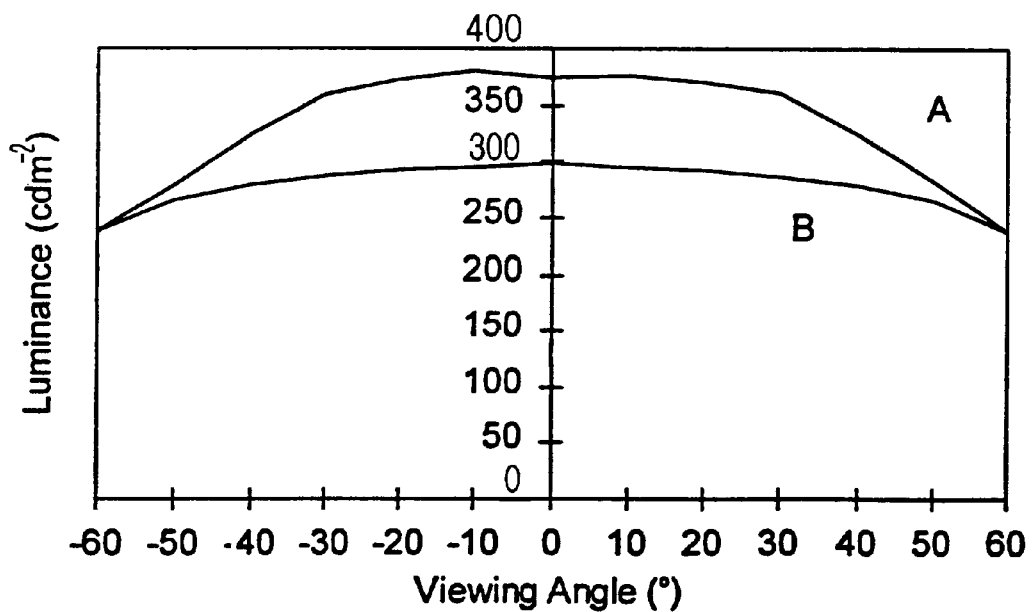
FIG. 8.2

BROADBAND REFLECTIVE POLARIZER

BACKGROUND OF THE INVENTION

Liquid crystal displays of the state of the art often show a reduced brightness due to light absorption in the optical path, which is in particular caused by the linear polarizers that are used in displays. For example, in backlit displays these linear polarizers can absorb more than 60% of the light intensity emitted from the backlight.

Therefore, circular reflective polarizers—in the following being referred to simply as "reflective polarizers"—have been developed that can very efficiently convert unpolarized light into polarized light. They usually comprise a layer of a chiral liquid crystalline material, like e.g. a cholesteric liquid crystal, that exhibits a helically twisted molecular structure and further exhibits planar alignment, i.e. wherein the axes of the molecular helices are oriented substantially perpendicular to the plane of the layer.

If unpolarized light is incident on such a reflective polarizer, 50% of the light intensity are reflected as circularly polarized light with the same twist sense as that of the molecular helix, whereas the other 50% are transmitted. The reflected light is depolarized (or its sense of polarization is reversed) in the backlight of the display, and is redirected onto the polarizer. In this manner theoretically 100% of a given waveband of the unpolarized light incident on the reflective polarizer can be converted into circularly polarized light.

The circularly polarized light can be converted into linear polarized light by means of a quarter wave optical retarder and optionally also a compensation film.

The bandwidth $\Delta\lambda$ of the waveband reflected by a reflective polarizer as described above depends on the birefringence of the mesogenic material $\Delta n$ and the pitch of the molecular helix p according to the equation $\Delta\lambda=\Delta n \times p$. Thus, the bandwidth is limited by the birefringence of the material. However, for an application in liquid crystal displays it is desirable that the bandwidth of the polarizer should comprise a substantial portion of the visible wavelength range.

Recently reflective polarizers have been developed that reflect a wider waveband of incident light. These polarizers comprise a liquid crystalline material with a helically twisted structure and a planar orientation, and are further characterized in that the pitch of the molecular helix varies in a direction normal to the layer, which leads to a large bandwidth of the reflected wavelength band.

The European Patent Application EP 0 606 940 discloses a circular reflective polarizer with a bandwidth of up to 400 nm that is consisting of a film of a polymerized cholesteric liquid crystal.

A suitable method to prepare a broadband reflective polarizer is e.g. by coating of a polymerizable liquid crystalline material with a cholesteric phase on a substrate or between two substrates in form of a thin layer, aligning the material into a planar orientation and polymerizing the material to freeze in the helically twisted, planar liquid crystalline phase structure.

Such a broadband reflective polarizer, when being used in combination with a quarter wave foil and optionally also a compensation film in a liquid crystal display, can give an increased brightness of up to 60–70% at normal viewing incidence.

At larger viewing angles, however, the luminance of a display with a broadband reflective polarizer decreases, and normally falls below the luminance of a display with a conventional linear polarizer (usually a dichroic polarizer) at some angle within a 60° viewing cone. The angle at which this occurs in the horizontal viewing plane is called the cross-over angle. For a broadband cholesteric polarizer with a high brightness gain this usually occurs at a maximum of around 50° when a compensator film is used.

Furthermore, at large viewing angles often an undesired color shift of the light transmitted by such a broadband reflective polarizer is observed.

SUMMARY OF THE INVENTION

It is therefore an aim of the present invention to provide a broadband reflective polarizer that shows improved optical properties at large viewing angles, in particular an improved off-axis brightness, and also exhibits a large bandwidth comprising a substantial portion of the visible spectrum of light, and in the ideal case covering the whole visible spectrum. Another aim is to provide a liquid crystal display device comprising such a polarizer.

The invention relates to a broadband reflective polarizer that comprises a layer of a polymerized mesogenic material exhibiting a helically twisted molecular orientation with planar alignment, said reflective polarizer being obtainable by a process wherein a mixture of a chiral polymerizable mesogenic material comprising a) at least one achiral polymerizable mesogenic compound,
b) at least one chiral compound that can in addition be polymerizable and/or mesogenic,
c) a polymerization initiator, is coated on a substrate or between two substrates in form of a layer, aligned in a planar orientation so that the axis of the molecular helix extends transversely to the layer, and polymerized by exposure to heat or actinic radiation, and optionally the substrates are removed from the polymerized material, characterized in that said polymerizable material is coated and polymerized between two different substrates, and/or at least one of said substrates comprises a barrier layer on the surface adjacent to the layer of said polymerizable material.

The invention further relates to a process of preparing such a broadband reflective polarizer and to a liquid crystal display comprising such a broadband reflective polarizer.

The inventors have found that the optical properties of a broadband reflective polarizer prepared as described above are very sensitive to the method of production of the polarizer. For example, it was found that the off-axis brightness of such a polarizer can be improved by altering the substrates between which the polymerizable chiral liquid crystalline material is coated, aligned and cured according to the process described above and below.

In particular, it was found that the off-axis brightness of the polarizer can be considerably increased if substrates are used exhibiting a different effect on the polymerisation rate when curing the polymerizable material, like e.g. different inhibition characteristics. This could be achieved e.g. by covering the surface of the substrate that will be in contact with the polymerizable mesogenic material by a barrier layer.

The broadband reflective polarizer film described in the EP 0 606 940 is prepared on a glass substrate. However, a process comprising the use of glass substrates is convenient only if small samples are produced. For the preparation of large area films, in particular for mass production glass substrates are highly unsuitable.

Thus, another aim of the invention is to provide a method of manufacturing a broadband reflective polarizer in an efficient and cost-effective manner which is in particular suitable for mass production. Other aims of the invention are immediately evident to a person skilled in the art from the following description.

It has now been found that the above mentioned aims can be achieved and the drawbacks of prior art can be overcome with a broadband reflective polarizer that is obtainable by a process as described in the following.

A broadband reflective polarizer prepared by a process according to the present invention is in particular advantageous in that, when used in a liquid crystal display, it exhibits a high luminance and a considerable brightness gain compared to a conventional linear polarizer (such as e.g. a dichroic polarizer) up to large viewing angles. In some cases, when using an inventive broadband reflective polarizer even no cross-over angle can be observed at all over the whole range of measured viewing angles. Furthermore, an inventive broadband reflective polarizer exhibits a high temperature stability of the mechanical and optical properties.

DETAILED DESCRIPTION OF THE INVENTION

One of the objects of the present invention is a broadband reflective polarizer that comprises a layer of a polymerized mesogenic material exhibiting a helically twisted molecular orientation with planar alignment, said reflective polarizer being obtainable by a process wherein a mixture of a chiral polymerizable mesogenic material comprising a) at least one achiral polymerizable mesogenic compound, b) at least one chiral compound that can in addition be polymerizable and/or mesogenic, c) a polymerization initiator, is coated on a substrate or between two substrates in form of a layer, aligned in a planar orientation so that the axis of the molecular helix extends transversely to the layer, and polymerized by exposure to heat or actinic radiation, and optionally the substrates are removed from the polymerized material, characterized in that said polymerizable material is polymerized between two different substrates, and/or at least one of said substrates comprises a barrier layer on the surface adjacent to the layer of said polymerizable material.

Another object of the invention is a process of preparing a broadband reflective polarizer as described in the foregoing and the following.

Another object the invention is a liquid crystal display comprising a liquid crystal cell and a reflective polarizer as described in the foregoing and the following, and optionally further comprising at least one of the following components I) an optical retardation film with a retardation which is approximately 0.25 times the wavelength of the band reflected by the reflective polarizer, II) a linear polarizer, III) a compensation film comprising a layer of an anisotropic polymer material with a homeotropic or tilted homeotropic orientation.

Preferred embodiments of the invention relate to a broadband reflective polarizer obtainable by a process as described above, wherein at least one of said substrates is a plastic film.

A broadband reflective polarizer obtainable by a process as described above, wherein two substrates are used that exhibit different polymerization inhibition characteristics.

A broadband reflective polarizer obtainable by a process as described above, wherein at least one of the substrates comprises an oxygen barrier layer preferably consisting essentially of polyvinylalcohol (PVA).

A broadband reflective polarizer obtainable by a process as described above, wherein the thickness of said oxygen barrier layer is from 0.5 $\mu$m to 20 $\mu$m, in particular from 1 to 10 $\mu$m.

A broadband reflective polarizer obtainable by a process as described above, the reflection characteristics of which, like the central wavelength, the shape or the bandwidth of the reflected spectrum and the viewing angle dependence of these reflection characteristics, are controlled by the use of two different of said substrates and/or of a barrier layer being coated onto at least one of said substrates.

A broadband reflective polarizer with a reflection bandwidth of at least 200 nm.

A broadband reflective polarizer wherein the pitch of the molecular helix varies asymmetrically in a direction normal to the plane of the polarizer.

A broadband reflective polarizer film with an asymmetrical pitch structure, wherein the pitch of the molecular helix substantially increases from a smaller value at one edge of the film to a higher value at the opposite edge of the film, in a direction normal to the film plane.

A broadband reflective polarizer obtainable by a process as described above, wherein the polymerized material forms a three-dimensional network.

A broadband reflective polarizer obtainable by a process as described above, wherein the chiral polymerizable mesogenic material contains at least one chiral polymerizable mesogenic compound having one polymerizable group and at least one achiral polymerizable mesogenic compound having one polymerizable group.

A broadband reflective polarizer obtainable by a process as described above, wherein the chiral polymerizable mesogenic material contains at least one chiral polymerizable mesogenic compound having one polymerizable group and at least one achiral polymerizable mesogenic compound having two or more polymerizable groups.

A broadband reflective polarizer obtainable by a process as described above, wherein the chiral polymerizable mesogenic material contains at least one non-polymerizable chiral compound and at least one achiral polymerizable mesogenic compound having one or two polymerizable groups.

A liquid crystal display device comprising the optical elements I, II and optionally also III as described above, wherein the linear polarizer is preferably situated in the optical path between the reflective polarizer and the liquid crystal cell.

A liquid crystal display device comprising the optical elements I, II and optionally also III as described above, wherein the angle between the optical axis of the linear polarizer II and the major optical axis of the optical retardation film I is from 30 degrees to 60 degrees.

The minimum and maximum wavelengths of the waveband reflected by an inventive reflective polarizer, i.e., the edges of the waveband, in this application are defined as those wavelengths on the given flank of the reflection spectrum where the curve has the steepest slope in absolute values; compare FIGS. 3.1–8.1. The bandwidth is simply given as the difference between minimum and maximum wavelength. The central reflection wavelength is given as the arithmetical average of the minimum and maximum wavelength.

In the process of preparing an inventive broadband reflective polarizer as described above, the substrates can exhibit a considerable effect upon the polymerization characteristics of the chiral polymerizable mesogenic material, such as inhibition of the onset of the polymerization, a reduction of the molecular weight by termination of growing polymer chains, a reduction of the polymerization rate, or a combination of two or more of these effects. In the following, these effects are generally referred to as 'inhibiting effect'.

For example, in the case of polymerization on plastic substrates, it could be shown that the relative rate of polymerization of the polymerizable mesogenic compounds, in particular of compounds comprising an acrylate group as polymerizable group, is descending in the following order: PET coated with PVA (>5 μm)>PET>TAC.

The rate of polymerization on PET coated with PVA can further be adjusted by varying the thickness of the PVA layer.

In case of polymerizing a layer of polymerizable mesogenic mixture between substrates with a strong inhibiting effect, like for example Polyester (such as PET) substrates, the inhibiting effect extends many microns into the layer and can still be observed at regions within the layer having a distance of up to 10 μm from the surface.

Thus, by curing a layer of a mixture of chiral polymerizable mesogenic material according to the inventive process e.g. between two different substrates having different inhibiting effects on the polymerization of the mixture, a gradient of the inhibitory effects above is produced, e.g., the polymerization rate of the forming polymer, is achieved through the thickness of the layer, since, e.g., the polymerization rate in the region of the layer close to the first substrate is different from the region of the layer close to the second substrate and different from the central region of the layer. As the helical pitch of the formed polymer depends on the polymerization rate, this results in a helical pitch gradient throughout the thickness of the resulting polymer film.

For example, if the polymerizable mixture is coated aligned and polymerized between two substrates, one of which has a greater inhibiting effect than the other, the resulting polymer film has an asymmetrical pitch structure, with a short pitch on the side of the film towards the substrate with the smaller inhibiting effect, and a long pitch on the side of the film towards the substrate with the greater inhibiting effect.

At constant film thickness an increase in the pitch gradient will lead to an increase in the total variation of the pitch, which in turn yields an increase in the bandwidth of the reflective polarizer. Thus, it is possible to prepare an inventive reflective polarizer e.g. with an asymmetrical pitch gradient and/or a broader bandwidth by using two substrates with different polymerization inhibiting effects in the inventive process.

On the other hand, when a layer polymerizable mixture is polymerized e.g. between two identical substrates both of which have strong inhibiting effect, the central region of the layer will polymerize rapidly, whereas the regions of the layer close to the surface will polymerize at a considerable slower rate. Thus, the resulting polymer film will have a substantially symmetrical pitch structure, with a short pitch in the central region and a longer pitch towards both surfaces of the film.

Broadband reflective polarizers according to the present invention with an asymmetrical pitch gradient are particularly preferred. These polarizers, when used in liquid crystal displays, give particular high brightness, and improved brightness also at large viewing angles.

Furthermore, by increased inhibition of the polymerization reaction throughout the polymerizable material it is possible to shift the entire reflection spectrum, and thus the central reflection wavelength, of the reflective polarizer towards higher wavelengths.

The term viewing angle as referred to in connection with an optical film or a combination of optical films, such as compensation or polarizer films, according to the present invention in the foregoing and the following is to be understood as the angle of observation relative to the normal of the plane of the film under which for example the contrast, the brightness and/or the color shift of the film is characterized by an acceptable level for the envisaged application.

A first aspect of the present invention is to use two substrates in the inventive process that exhibit different polymerization characteristics, for example, two substrates that have different inhibiting effects on the cure rate in the polymerizable mesogenic material.

A second aspect of the present invention is to alter the polymerization characteristics of the substrates used in the inventive process, in order to obtain the desired pitch gradient. For example, it is possible to cover the substrates with a barrier layer that reduces the inhibiting effect of the substrate on the polymerization of the polymerizable material.

Thus, a first preferred embodiment of the present invention relates to a process as described above, wherein the chiral polymerizable mesogenic material is coated between two different substrates, in particular between two substrates having different effects on the polymerization of said polymerizable material.

This can also be understood such that the inner surfaces of these substrates are different, with the term inner surface of a substrate in this connection indicating the surface adjacent to the polymerizable material.

For example, it is possible to use as substrates two films of a different material, e.g. one glass substrate and one plastic film, or two different plastic films, like e.g. a PET film and a TAC film.

As described above, the rate of polymerization of an inventive polymerizable mixture on plastic substrates is decreasing in the order PET coated with PVA>PET>TAC.

Thus, by using different combinations of substrates selected from this group it is possible to achieve a polymer film with a desired pitch gradient even without using a barrier layer. With the explanations given above and below the expert can select further appropriate combinations of substrates in order to realize an inventive polarizer with the desired properties. Some further suitable combinations of substrates can also be taken from the examples.

Alternatively it is possible to use two substrates of the same or a different material, wherein the inner surface of one of these substrates is covered with a layer of a material different from the inner surface of the other substrate, or both inner surfaces are coated with different materials. For example, two plastic films can be used as substrates, wherein the inner surface of one film is coated with an oxygen barrier layer, whereas the other film remains uncovered.

The material covering the inner surface of the substrates can be applied for example by coating the material onto the substrate using conventional techniques, or by lamination of a thin film of the material onto the substrate.

Particularly preferably two different plastic films, like e.g. a TAC film and a PET film, are used. In another preferred embodiment, two different or identical plastic films, preferably PET or TAC, are used, at least one of which is covered by an oxygen barrier layer, preferably a PVA layer.

A second preferred embodiment of the invention relates to a process as described above, wherein at least one of the substrates is covered with a barrier layer. The barrier layer prevents various gases, e.g., oxygen, moisture and/or radicalic or ionic impurities from passing through the substrate or out of the substrate into the polymerizable mixture, where they would inhibit the polymerization reaction. Thus, the inhibiting effect of the substrate on the polymerizable mixture is decreased or even removed by the barrier layer. Preferably, a barrier layer excluding oxygen and/or water is used.

For example, if the polymerizable material is coated aligned and polymerized between two substrates, one of which is coated with an oxygen barrier layer, the resulting polymer film has an asymmetrical pitch structure, with a short pitch on the side of the film towards the substrate with the barrier layer and a long pitch on the side of the film towards the substrate without the barrier layer As a barrier layer in principle every material can be used that is known to the skilled in the art for this purpose. Typically used barrier layer materials are inorganic materials such as aluminium, aluminium oxide, or various types of silicon oxide.

As an oxygen barrier layer, for example materials can be used that are applied in the food packaging industry to improve the shelf life of foodstuffs. A preferred material to be used as oxygen barrier layer is polyvinylalcohol (PVA).

The barrier layer materials are deposited typically as a thin layer, with a thickness in the range of a few microns, which in some cases can be even less than 0.1 $\mu$m. The deposition can be achieved by known methods, like e.g. by sputtering or vapour deposition onto the substrate.

Preferably an oxygen barrier layer is prepared by coating the substrates used in the inventive process with a thin film of the barrier layer material with conventional techniques. For example, a PVA oxygen barrier layer can be coated from an aqueous solution of about 5 to 30% of PVA having a molecular weight typically from 10,000 to 500,000, to give a wet thickness of about 10 to 100 $\mu$m and, after the solvent has evaporated, to give a coated thickness of about 1 to 10 $\mu$m.

The barrier layer preferably has a thickness from 0.5 to 20 $\mu$m, in particular from 1 to 10 $\mu$m, very preferably from 2 to 7 $\mu$m.

The use of PVA as oxygen barrier layer provides as an additional advantage that PVA gives good homogeneous (i.e. planar) alignment of the polymerizable mesogenic material that is used in the inventive process.

In case a barrier layer material is used that promotes homeotropic or tilted alignment of the polymerizable mesogenic mixture, it is also possible to apply an additional alignment layer that promotes planar alignment of the polymerizable mixture on top of the barrier layer.

Particularly preferred is a process according to this preferred embodiment using two substrates, wherein the inner surface of one substrate is covered by an oxygen barrier layer. Further preferred is a process wherein the inner surfaces of both substrates are covered by an oxygen barrier layer.

Another preferred embodiment relates to an inventive process as described above, wherein a layer of the polymerizable mesogenic material is polymerized on a single substrate, and the free side of the layer is contact with an atmosphere of air or inert gas. In this case, the air or the inert gas substitutes a second substrate which exhibits a different polymerization inhibiting effect on the polymerizable material compared to the single substrate. This embodiment is especially preferred for the preparation of thin polarizer films with a thickness of 10 $\mu$m or less.

In case an air atmosphere is used, the inner surface of the single substrate is covered with a barrier layer, preferably an oxygen barrier layer, that shows a reduced. polymerization inhibiting effect on the polymerizable mesogenic material compared to the free air surface. This results in a polymerized film with a longer pitch on the air side and a shorter pitch on the single substrate side.

The waveband reflected by the inventive broadband reflective polarizer is ideally covering the whole visible spectrum, and is preferably within a wavelength range from 400 to 900 nm. For most applications, a reflected waveband within a range from 450 to 800 nm is acceptable. In specific embodiments, a reflected waveband within a range from 480 to 700 nm is still suitable.

The bandwidth of the wavelength band is preferably larger than 200 nm, particularly preferably larger than 300 nm, very particularly preferably larger than 400 nm.

The transmission versus wavelength curve of the transmission spectrum of a broadband reflective polarizer according to the present invention (as depicted, for example, in the FIGS. 3.1 to 8.1) can be of symmetric or asymmetric shape. It can be unimodal, bimodal or exhibit a multiple peak distribution, which means that it can show one, two or more than two local maxima of reflection.

A preferred embodiment of the present invention is characterized in that the spectrum has a unimodal peak distribution.

A broadband reflective polarizer film according to the present invention is characterized in that the helical pitch of the helically twisted molecular structure varies in a direction normal to the plane of the layer. This variation can be symmetrical, with the pitch increasing from a minimum value—or decreasing from a maximum value—in the middle of the layer towards the outer edges of the film, or it can be asymmetrical, with the pitch substantially increasing from a smaller value at one edge of the film to a higher value at the opposite edge of the film.

Preferably the inventive reflective polarizer exhibits an asymmetrical structure of the helical pitch, with the pitch substantially increasing from a smaller, preferably a minimum, value at one edge of the film to a higher, preferably a maximum, value at the opposite edge of the film, in the direction normal to the layer.

In order to create linear polarized light, e.g. when used in a liquid crystal display, an inventive reflective polarizer is preferably used in combination with an optical retardation film. The optical retardation film is comprising a layer of a birefringent material selected such that its optical retardation is approximately 0.25 times the wavelength of the centre of the bandwidth reflected by the broadband reflective polarizer. As a result, this retarder serves as a quarter wave plate or foil (QWF) which converts circular polarized light into linear polarized light.

As a QWF for example a stretched plastic film, such as stretched PET, PVA, PC or TAC can be used. It is also possible to use a layer of an oriented polymerized liquid crystalline material.

The QWF may be connected to the reflective polarizer as a separate optical element. Preferably, the reflective polarizer and the QWF are integrated so that they form an individual optical element. This can be done for example by laminating the QWF and the reflective polarizer together after manufacturing the polarizer.

In another preferred embodiment the chiral polymerizable mesogenic material is coated and cured directly on a QWF which serves as a substrate, thus simplifying the production process.

When a single QWF is used together with the reflective polarizer, its retardation typically increases with decreasing wavelength, since the birefringence will increase towards lower wavelengths. This spread of the birefringence, which is known as dispersion, is low for some materials, like e.g. PVA, but higher for other materials, like e.g. PC and PET. This leads to a mismatch between retardation of the QWF and the wavelengths reflected by the reflective polarizer. As a result, the conversion from circularly polarized light into linearly polarized light is not optimal over the entire bandwidth of the polarizer. This can be a disadvantage in particular for broadband polarizers.

Therefore in another preferred embodiment an inventive liquid crystal display device comprises a combination of two or more optical retardation layers, the retardation of these layers being selected in such a manner that due to the difference in retardation of the layers the nett retardation of the combination is approximately 0.25 times the wavelength of the light reflected by the polarizer over a substantial portion of the reflected bandwidth of the polarizer. This combination of layers is then used as a QWF together with the inventive reflective polarizer.

In another preferred embodiment the inventive reflective polarizer and the QWF are used together with a compensation film in order to compensate the viewing angle dependence of the phase retardation of light transmitted by the reflective polarizer and/or the QWF. The compensation film can be positioned adjacent to either side of the QWF.

Preferably a compensation film is used of which the phase retardation is opposite in sign and substantially equal in magnitude to the phase retardation of the reflective polarizer over a wide range of viewing angles.

Particularly preferably a compensation film is used that comprises a layer of an anisotropic polymer material with a homeotropic or tilted homeotropic orientation.

In another preferred embodiment the chiral polymerizable mesogenic material is coated and cured directly on a compensator film and/or a QWF that serve as substrates, wherein the compensator and the QWF are comprising a layer of liquid crystal polymer or polymerized mesogenic material having mesogenic groups with similar structure like those of the chiral polymerizable mesogenic material used in the inventive process. Particularly preferred are compensation films and QWFs made of a polymerizable mixture comprising one or more achiral polymerizable compounds of formula I given below.

Thereby, the optical characteristics of the inventive reflective polarizer can be improved as described above, while at the same time it is possible to directly obtain a combined optical film product comprising the inventive reflective polarizer and a compensation and/or QWF layer.

Compensation films and QWFs that comprise a layer of polymerized mesogenic material and are suitable as a substrate in the inventive porcess are described in the International Applications WO 98/00475 and WO 98/94651.

The light incident on the reflective polarizer is tranformed into circularly polarized light. However, this applies only to light with a wavelength corresponding to the bandwidth of the polarizer, and to light at normal incidence, i.e. parallel to the axis of the molecular helix, whereas, for example, light passing through the reflective polarizer at an angle to the normal will become elliptically polarized. This light will not be transformed completely by the QWF into linear polarized light of a single plane of polarization.

Especially when using the inventive reflective polarizer for the illumination of a liquid crystal display cell, this elliptically polarized component of light can lead to undesired reduction of the contrast of the display. Therefore in a preferred embodiment of the present invention a linear polarizer is provided in the optical path of the display after the QWF in order to cut off the component of light emitting from the reflective polarizer which is not ideally circularly polarized.

The linear polarizer disclosed above is preferably provided such that the angle between its optical axis and the major optical axis of the QWF is ranging from 30 to 60 degrees, especially preferably between 40 and 50 degrees.

The inventive reflective polarizer and liquid crystal display can additionally comprise other film or sheet components such as diffusers, adhesive layers, protective or release layers.

BRIEF DESCRIPTION OF THE DRAWINGS

FIG. 2.1 shows a first setup A for the optical measurements as described in examples 1–6.

FIG. 2.2 shows a second setup B for the optical measurements as described in examples 1–6.

FIGS. 3.1, 4.1, 5.1, 6.1, 7.1 and 8.1 show the transmission spectrum of a broadband reflective polarizer prepared according to example 1, 2, 3, 4, 5 and 6 7 respectively, with curve (a) indicating the transmitted light and curve (b) indicating the reflected light.

FIGS. 3.2, 4.2, 5.2, 6.2, 7.2 and 8.2 show the relative luminance versus viewing angle measured for a setup A (curve A), as shown in FIG. 2.1, which is comprising a broadband reflective polarizer prepared according to example 1, 2, 3, 4, 5 and 6 respectively, and measured for a setup B (curve B), as shown in FIG. 2.2, which is not containing the broadband reflective polarizer.

Figure 1:
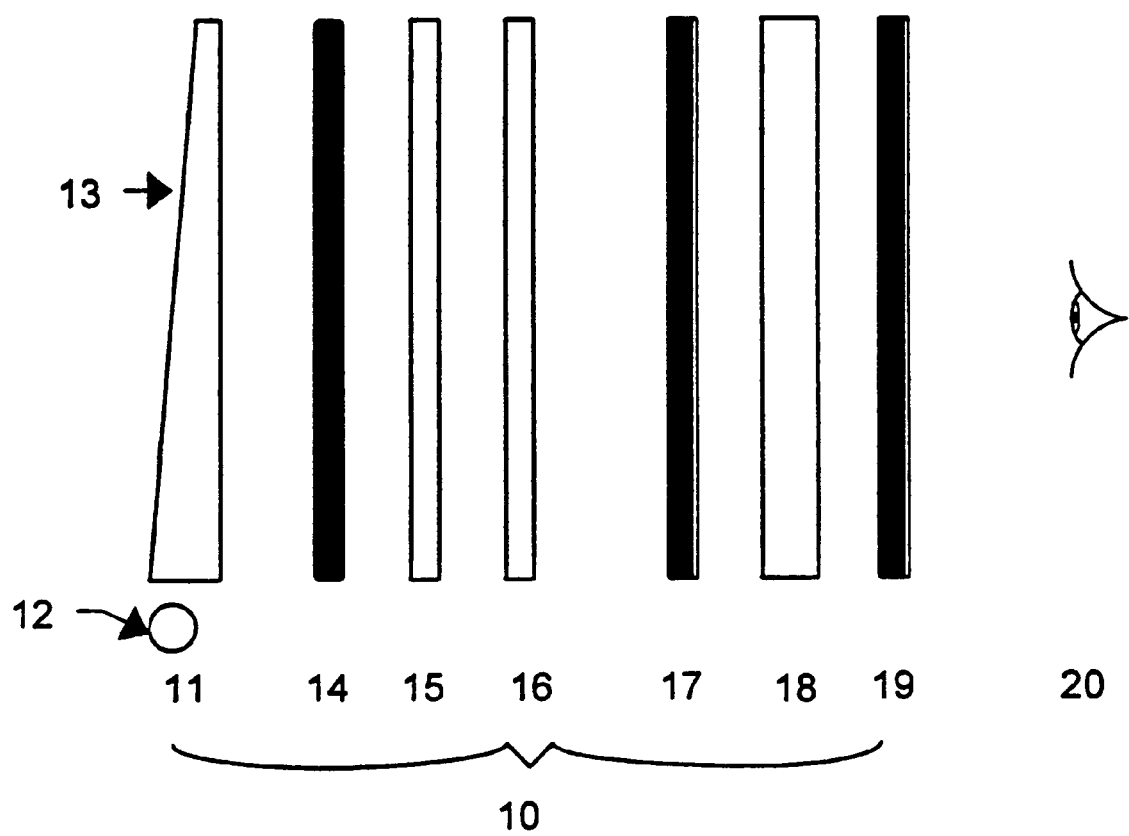
FIG. 1 shows a display device according to an exemplary embodiment of the present invention.

The function of the inventive reflective polarizer is further explained by FIG. 1, which illustrates an exemplary embodiment of the invention. The main direction of light following the optical path is from the left side to the right side. The figure shows a display device 10 with a side-lit backlight unit 11 with a lamp 12 and a combined light guide and reflector 13, an inventive reflective polarizer 14, a QWF 15, a compensation film comprising a layer of a homeotropically aligned polymerized liquid crystalline material 16, and a linear polarizer 17. The figure further depicts a liquid crystal cell 18 and a second linear polarizer 19 behind the display cell.

Light emitted from the backlight 11 is interacting in a substantial part with the reflective polarizer 14. Half of the intensity of the interacted light is transmitted as right-handed or left-handed circularly polarized light respectively, whereas the other half is reflected as circular polarized light of the opposite handedness. The reflected light is redirected by the reflector 13 onto the reflective polarizer 14. The main part of the transmitted component is converted by the QWF 15 and the compensation film 16 into linear polarized light. Light which is not ideally linear polarized, such as elliptically polarized light, is cut off by the linear polarizer 17. The linear polarized light then passes through the display 18 and the second linear polarizer 19 to reach the viewer 20.

The brightness gain when using a broadband reflective polarizer according to the present invention instead of a conventional linear polarizer in a liquid crystal display is preferably at least 50% or higher, in particular preferably at least 70% or higher compared to.

The brightness gain in this connection is defined as $I_a/I_b - 1$, wherein $I_a$ is the intensity of light which is transmitted after passing through an assembly as depicted in FIG. 2.1, consisting of an LCD backlight 20, an inventive reflective polarizer 21, a QWF 22, a compensation film 23 and a linear polarizer 24, and $I_b$ is the intensity of light transmitted by an assembly as depicted in FIG. 2.2, consisting only of the backlight 20 and the linear polarizer 24 of the setup described above.

The brightness gain is depending on the efficiency of the light source to re-reflect rays of light. The preferred value given above is relating to an efficient light source such as a conventional side-lit or meander backlight.

The measured brightness gain also depends on the sample size of the reflective polarizer covering the entire area of the backlight. If the backlight is only partially covered, the brightness gain decreases due to some of the light that is reflected back from the polarizer subsequently escaping from the system.

The cross over angle of a display comprising an inventive broadband reflective polarizer is preferably at least 40°, particularly preferably at least 50°. Preferably no cross over angle is observed within a 60° cone of viewing angles.

The color difference ($\Delta E^*_{uv}$ in the CIE 1976 L*u*v* color space) of a display comprising an inventive reflective broadband polarizer is preferably lower than that of a display that comprising a state of the art broadband polarizer for viewing angles from 0° to 90°, i.e. for all possible viewing angles.

In case of the use of an inventive reflective polarizer with an asymmetrical pitch structure as described above in backlit displays, the reflective polarizer is preferably located such that the side of the polarizer having a long pitch is facing the backlight.

Apart from backlit displays, the reflective polarizer and the polarizer combination according to the present invention can also be applied in a reflective display, which instead of an electric light source makes use of a reflector that reflects light generated outside the display. The invention thus also relates to a reflective liquid crystal display device comprising an inventive reflective polarizer.

The chiral polymerizable mesogenic material used in the inventive process can comprise polymerizable compounds with one polymerizable group (monofunctional) and compounds with two or more polymerizable groups (di- or multifunctional). By varying the concentration of monfucntional and di- or multifunctional polymerizable compounds the crosslink density of the polymer film and thereby its physical and chemical properties such as the glass transition temperature, which is also important for the temperature dependence of the optical properties of the polarizer, the thermal and mechanical stability or the solvent resistance can be tuned easily.

The polymerizable mixture used for preparation of the inventive polarizer comprises at least one achiral and at least one chiral compound. By changing the ratio of chiral and achiral compounds the pitch lengths and thus the central wavelength of the reflected wavelength band of the polarizer can be varied. Preferably the ratio of the chiral and achiral mesogenic compound is selected so that the reflected spectrum is covering a substantial part of the spectrum of visible light.

The terms polymerizable mesogen, polymerizable mesogenic compound or polymerizable liquid crystal or liquid crystalline compound as used in the foregoing and the following comprise compounds with a rod-shaped, board-shaped or disk-shaped mesogenic group (i.e. a group with the ability to induce mesophase behavior in a compound comprising such a group). These compounds do not necessarily have to exhibit mesophase behavior by themselves. In a preferred embodiment of the present invention they show mesophase behavior only upon admixture with other compounds or upon polymerization of the polymerizable mesogenic compounds or the mixtures comprising them.

Preferably the polymerizable mesogenic compounds exhibit mesophase behavior on their own.

The term "mesogenity supporting group" as used in the foregoing and the following is indicating a rod-shaped, board-shaped or disk-shaped group, which does not necessarily have to show mesogenic behavior (i.e. the ability to induce mesophase behavior in a compound comprising such a group) alone. It is also possible that such a group shows mesogenic behavior if being combined in a compound with other groups, or if the compound comprising the mesogenity supporting group is polymerized or admixed with other compounds comprising the same or other mesogenic or mesogenity supporting groups.

The achiral polmerizable mesogenic compounds of component a) are preferably selected of formula I

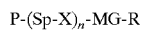

P-(Sp-X)$_n$-MG-R    I wherein
P is CH$_2$=CW—COO—, WCH=CH—O,

or CH$_2$=CH-Phenyl-(O)$_k$- with W being H, CH$_3$ or Cl and k being 0 or 1,

Sp is a spacer group having 1 to 20 C atoms,

X is a group selected from —O—, —S—, —CO—, —COO—, —OCO—, —OCO—O—, —S—CO—, —CO—S— or a single bond, n is 0 or 1, R is an achiral alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P-(Sp-X)$_n$-, and MG is a mesogenic or mesogenity supporting group preferably selected of formula II

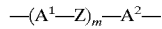

—(A$^1$—Z)$_m$—A$^2$—    II wherein
Z is in each case independently —COO—, —OCO—, —CH$_2$CH$_2$—, —OCH$_2$—, —CH$_2$O—, —CH=CH—, —CH=CH—COO—, —OCO—CH=CH—, —C≡C— or a single bond, A$^1$ and A$^2$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, and m is 1, 2 or 3.

As for the chiral compounds of component b), in principal all compounds can be used that are known to the skilled in the art for this purpose. Typical compounds are e.g. the commercially available chiral dopants S 101 1, R 811 or CB 15 (Merck KGaA, Darmstadt, Germany).

In a preferred embodiment of the present invention, component b) of the chiral polymerizable mesogenic material is essentially consisting of polymerizable chiral compounds, preferably polymerizable chiral mesogenic compounds.

The polymerizable chiral compounds are preferably selected of formula III

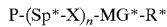

P-(Sp*-X)$_n$-MG*-R*        III wherein P, X and n have the meanings given for formula I,
Sp* is a spacer group having 1 to 20 C atoms,
MG* is a mesogenic or mesogenity supporting group, which is preferably selected of formula II given above, and
R* is H or an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S—, or —C≡C— in such a manner that oxygen atoms are not linked directly to one another, or alternatively R* is halogen, cyano or has independently one of the meanings given for P-(Sp-X)$_n$-,
with at least one of Sp*, MG* and R* comprising a chiral structure element.

Particularly preferred are polymerizable mixtures comprising at least two polymerizable mesogenic compounds at least one of which is a compound of formula I.

In another preferred embodiment of the invention the achiral polymerizable mesogenic compounds are selected according to formula I, wherein R has one of the meanings of P-(Sp-X)$_n$- as given above.

Of the compounds of formula I and III especially preferred are those in which R and R* are F, Cl, cyano, or optionally halogenated alkyl or alkoxy, or has the meaning given for P-(Sp-X)$_n$- or P-(Sp*-X)$_n$- respectively. Further preferred are compounds wherein MG and MG* are of formula II with Z$^1$ and Z$^2$ being each independently —COO—, —OCO—, —CH$_2$—CH$_2$—, —CH=CH—COO—, —OCO—CH=CH— or a single bond.

Of the mesogenic groups wherein A$^1$ and/or A$^2$ denote a heterocyclic group, those containing a pyridine-2,5-diyl group, pyrimidine-2,5-diyl group or 1,3-dioxane-2,5-diyl group are particularly preferred.

Of the preferred mesogenic groups containing a substituted 1,4-phenylene group very particularly preferred are those substituted by F, Cl or an optionally fluorinated alkyl, alkoxy or alkanoyl group with 1 to 4 C atoms.

A smaller group of particularly preferred mesogenic groups of the formula II is listed below. For reasons of simplicity, in these formulae PheL is 1,4-phenylene, which is substituted in 2- and/or 3-position with L, wherein L denotes halogen, a cyano or nitro group or an alkyl, alkyloxy or alkanoyl group having 1 to 7 C atoms wherein one or more H atoms may be substituted by F or Cl,and Cyc is 1,4-cyclohexylene. Z in these groups, unless otherwise indicated, has the meaning given in formula I as described above and below. The group of preferred mesogenic groups of formula II comprises the formula II-1 to II-24 as well as their mirror images

| | |
|---|---|
| —Phe—Z—Phe— | II-1 |
| —Phe—Z—Cyc— | II-2 |
| —Cyc—Z—Cyc— | II-3 |
| —PheL—Z—Phe— | II-4 |
| —PheL—Z—Cyc— | II-5 |
| —PheL—Z—PheL— | II-6 |
| —Phe—Z—Phe—Z—Phe— | II-7 |
| —Phe—Z—Phe—Z—Cyc— | II-8 |
| —Phe—Z—Cyc—Z—Phe— | II-9 |
| —Cyc—Z—Phe—Z—Cyc— | II-10 |
| —Phe—Z—Cyc—Z—Cyc— | II-11 |
| —Cyc—Z—Cyc—Z—Cyc— | II-12 |
| —Phe—Z—Phe—Z—PheL— | II-13 |
| —Phe—Z—PheL—Z—Phe— | II-14 |
| —PheL—Z—Phe—Z—PheL— | II-15 |
| —PheL—Z—PheL—Z—Phe— | II-16 |
| —PheL—Z—PheL—Z—PheL— | II-17 |
| —Phe—Z—PheL—Z—Cyc— | II-18 |
| —Phe—Z—Cyc—Z—PheL— | II-19 |
| —Cyc—Z—Phe—Z—PheL— | II-20 |
| —PheL—Z—Cyc—Z—PheL— | II-21 |
| —PheL—Z—PheL—Z—Cyc— | II-22 |
| —PheL—Z—Cyc—Z—Cyc— | II-23 |
| —Cyc—Z—PheL—Z—Cyc— | II-24 |

In the formulae II-1 to II-24, Z is preferably an ester group (—CO—O— or —O—CO—), —CH$_2$CH$_2$— or a single bond.

L in these preferred formulae is preferably F, Cl, CN, NO$_2$, CH$_3$, C$_2$H$_5$, OCH$_3$, OC$_2$H$_5$, COCH$_3$, COC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, Cl, CH$_3$, OCH$_3$ and COCH$_3$.

Particularly preferably MG and MG* are selected from the following formulae including their mirror images

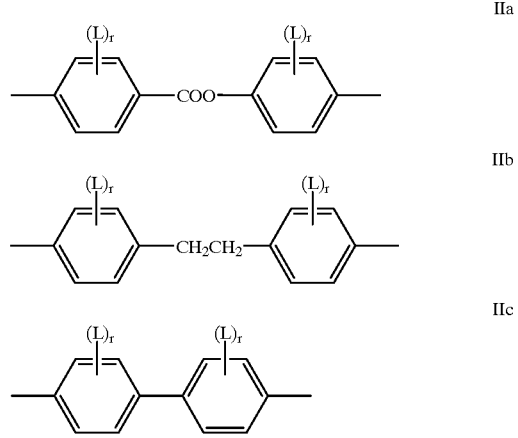

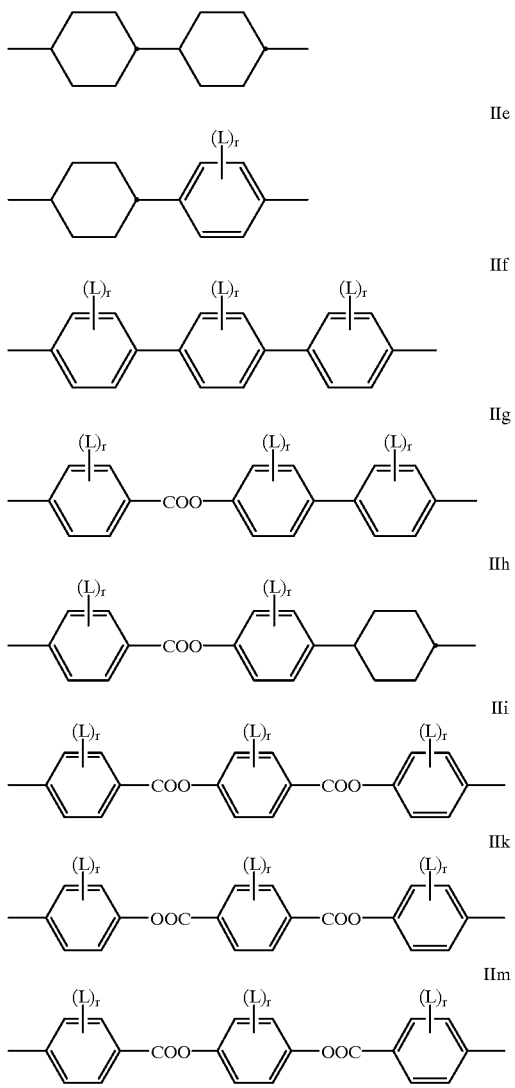

wherein L has the meaning given above and r is 0, 1 or 2. The group

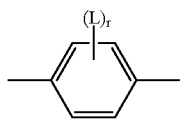

in these preferred formulae is very preferably denoting

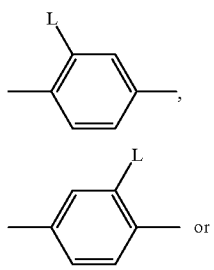

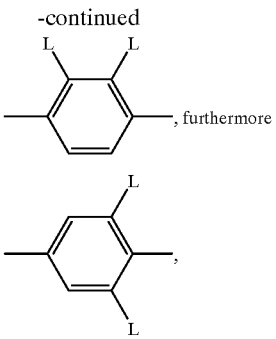

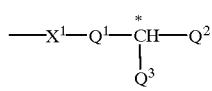

with L having each independently one of the meanings given above.

In the achiral polymerizable mesogenic compounds of the formula I, R is preferably an achiral alkyl radical which is unsubstituted or substituted by at least one halogen atom, it being possible for one or two non-adjacent $CH_2$ groups of these radicals to be replaced by —O—, —S—, O—CO—, —CO—O— or —O—CO—O— groups.

Halogen is preferably F or Cl.

If R is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5- oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9- oxadecyl, for example.

In the polymerizable mesogenic compounds of formula III R* may be an achiral or a chiral group. In case of an achiral group R* preferably has one the preferred meanings given for R above. In case of a chiral group R* is preferably selected according to the following formula IV:

$$—X^1—Q^1—\overset{*}{C}H—Q^2 \\ | \\ Q^3$$
IV wherein $X^1$ has the meaning given for X, $Q^1$ is an alkylene or alkylene-oxy group with 1 to 10 C atoms or a single bond, $Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, or alternatively has the meaning given for P-Sp-, $Q^3$ is halogen, a cyano group or an alkyl or alkoxy group with 1 to 4 C atoms different from $Q^2$.

Preferred chiral groups R* are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I and/or III containing an achiral branched group R or R* respectively may occasionally be of importance as comonomers, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

In another preferred embodiment R* in formula IIl1 is denoting a chiral group that is selected from the following groups:

an ethylenglycol derivative

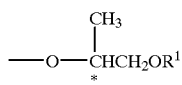

wherein $R^1$ is an alkyl radical with 1 to 12 C atoms, or a group based on citronellol

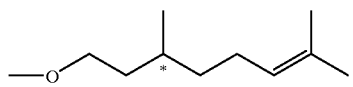

In another preferred embodiment of the present invention the compounds of formula III comprise a mesogenic or mesogenity supporting group MG* having at least one center of chirality. In these compounds MG* is preferably selected according to formula II*A or II*B:

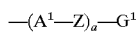   II*A

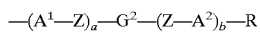   II*B wherein $A^1$, $A^2$ and Z have the meaning given in formula II, R has the meaning given in formula I, a and b are independently of each other 0, 1 or 2, and $G^1$ is a terminal chiral group, such as for example a cholesteryl group, a terpenoid radical like e.g. disclosed in the WO 96/17901, particularly preferably a menthyl group, or a terminal chiral sugar derivative comprising a mono- or dicyclic radical with pyranose or furanose rings like, for example, a terminal group derived from the chiral sugars or sugar derivatives as disclosed e.g. in the international application WO 95/16007, and $G^2$ is a bivalent chiral group, like for example a (R,R)- or (S,S) hydrobenzoin group

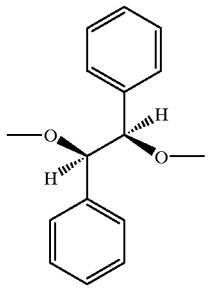

or a bivalent chiral sugar, sugar derivative or another bivalent chiral radical, as disclosed e.g. in the international application WO 95/16007, especially preferably a group based on 1,4:3,6-Dianhydro-D-sorbitol:

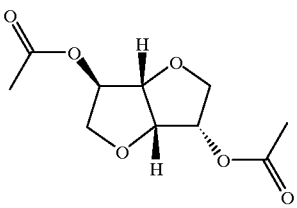

In case $G^2$ is a group based on 1,4:3,6-Dianhydro-D-sorbitol as diclosed above, Z is preferably denoting —CH=CH—.

In the compounds of formula I and III P is denoting

$CH_2$=CW—COO, WCH=CH—O— or $CH_2$=CH-Phenyl-$(O)_k$— with W being H, $CH_3$ or Cl and k being 0 or 1.

Preferably P is a vinyl group, an acrylate or methacrylate group, a propenyl ether group or an epoxy group. Especially preferably P is an acrylate or methacrylate group.

The polymerizable mesogenic compounds have up to four, in particular up to three, very preferably one or two polymerizable groups.

As for the spacer groups Sp and Sp*, all groups can be used that are known for this purpose to the skilled in the art. The spacer is preferably linked to the polymerizable group P by an ester or ether group or a single bond. The spacer is preferably a linear or branched alkylene group having 1 to 20 C atoms, in particular 1 to 12 C atoms, in which, in addition, one or more, non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH=CH— or —C≡C—.

Typical spacer groups are for example —$(CH_2)_o$—, —$(CH_2CH_2O)_r$— $CH_2CH_2$—, —$CH_2CH_2$—S—$CH_2CH_2$— or —$CH_2CH_2$—NH—$CH_2CH_2$—, with o being an integer from 2 to 12 and r being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyl-iminoethylene and 1-methylalkylene, for example.

In a preferred embodiment of the invention the polymerizable mesogenic compounds of formula III comprise a spacer group Sp* that is a chiral group of the formula V:

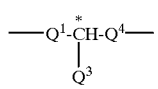
V wherein
$Q^1$ and $Q^3$ have the meanings given in formula IV, and $Q^4$ is an alkylene or alkylene-oxy group with 1 to 10 C atoms or a single bond, being different from $Q^1$.

Further preferred are chiral spacer groups Sp* based on naturally available materials, such as e.g. citronellol or lactate derivatives.

Particularly preferred are compounds of formula I and/or III wherein n is 1.

In another preferred embodiment, the inventive reflective polarizer is obtained by copolymerizing mixtures comprising compounds of formula I and /or formula III wherein n is 0 and compounds of formula I and/or formula III wherein n is 1.

In the event that R, R* or $Q^2$ is a group of formula P-Sp-X- or P-Sp*-X- respectively, the spacer groups on each side of the mesogenic core may be identical or different.

The polymerizable mesogenic compounds of formula I and III and the non-polymerizable compounds of formula VI can be prepared by methods which are known per se and which are described, for example, in standard works of organic chemistry such as, for example, Houben-Weyl, Methoden der organischen Chemie, Thieme-Verlag, Stuttgart. Some specific methods of preparation can be taken from the examples.

Polymerizable mesogenic compounds according to formula I and III are described for example in WO 93/22397; EP 0 261 712; DE 19504224; DE 4408171 and DE 4405316. The compounds disclosed in these documents, however, are to be regarded merely as examples that should not limit the scope of this invention.

Examples representing polymerizable mesogenic compounds of formula I and III are shown in the following list of compounds, which should, however, be taken only as illustrative and is in no way intended to restrict, but instead to explain the present invention:

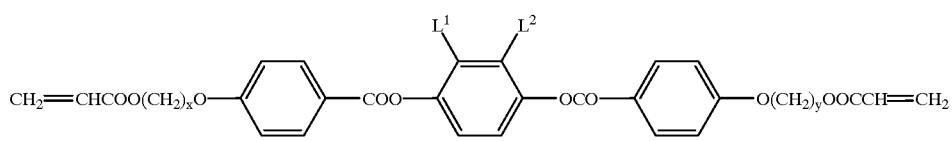
(Ia)

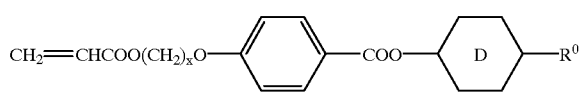
(Ib)

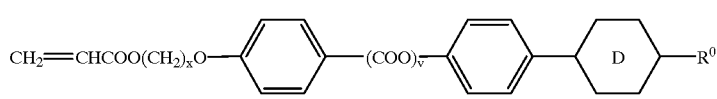
(Ic)

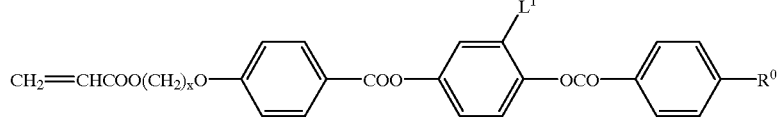
(Id)

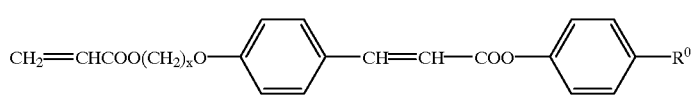
(Ie)

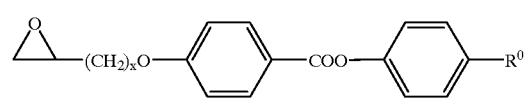
(If)

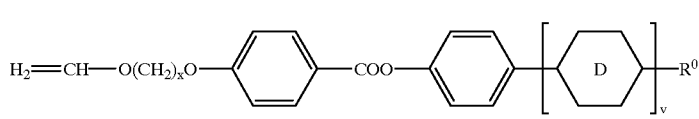
(Ig)

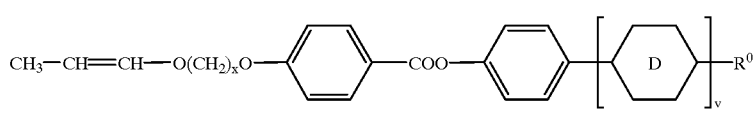
(Ih)

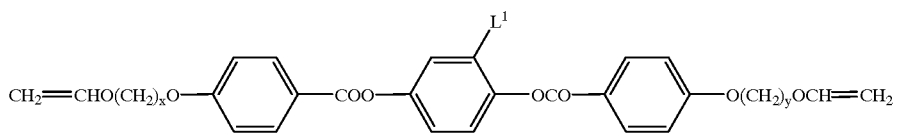
(Ii)
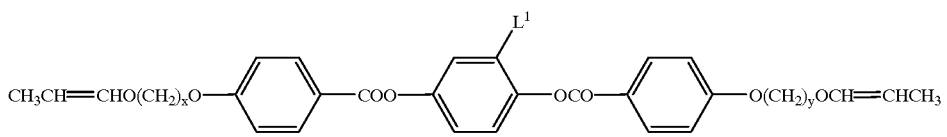
(Ik)
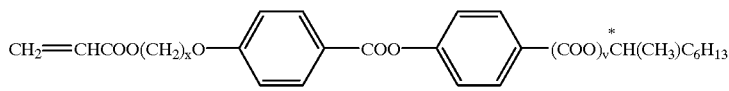
(IIIa)
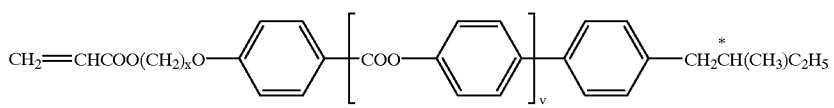
(IIIb)
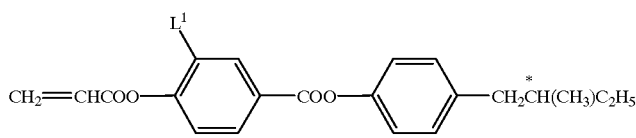
(IIIc)
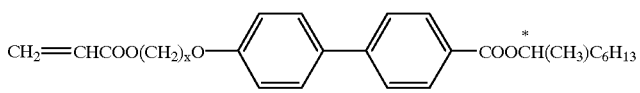
(IIId)
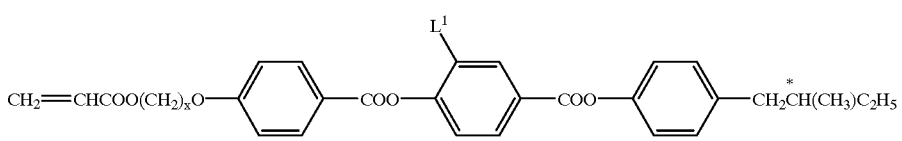
(IIIe)
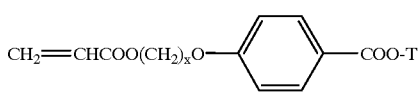
(IIIf)
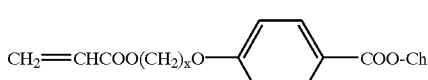
(IIIg)
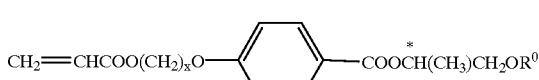
(IIIh)
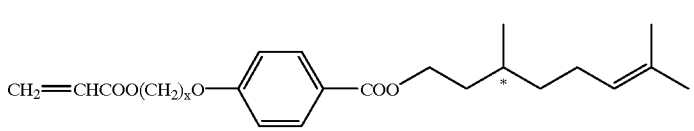
(IIIi)

-continued

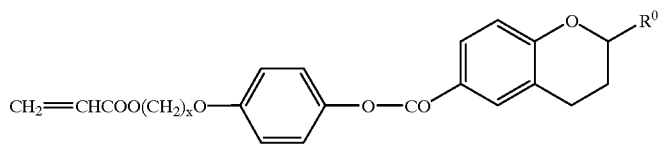
(IIIk)

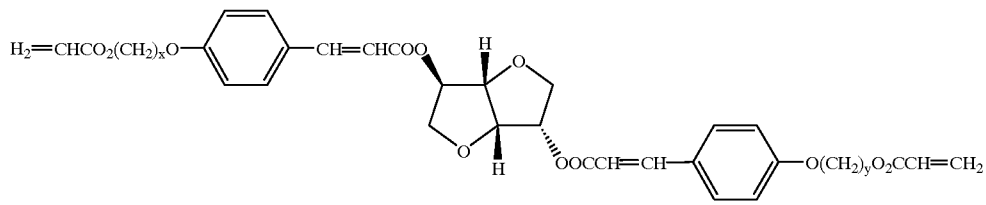
(IIIm)

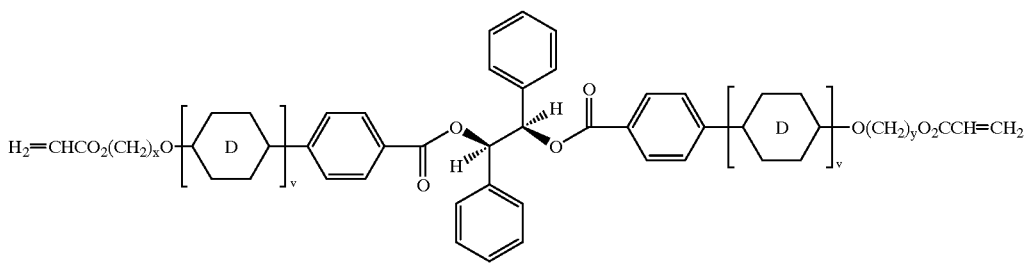
(IIIn)

wherein x and y are each independently 1 to 12 v is 0 or 1, D is a 1,4-cyclohexylene or an optionally halogenated 1,4-phenylene group, T is a terpenoid radical like e.g. menthyl, Ch is a cholesteryl group, $R^0$ is halogen, cyano or a chiral or achiral alkyl or alkoxy group with 1 to 12 C atoms and $L^1$ and $L^2$ are each independently H, halogen, CN, or an alkyl, alkoxy or alkanoyl group with 1 to 7 C atoms.

In a preferred embodiment of the present invention the achiral polymerizable compounds of formula I are selected of the above formulae Ia to Ik wherein $R^0$ is an achiral group.

In another preferred embodiment of the present invention the chiral polymerizable compounds of formula III are selected of the above formulae IIIa to IIIm or of formula Ib to Ih wherein $R^0$ is a chiral group.

In another preferred embodiment of the present invention, component b) of the chiral polymerizable mesogenic material is essentially consisting of non-polymerizable chiral mesogenic compounds such as e.g. chiral dopants like those mentioned above. Particularly preferably non-polymerizable chiral compounds are used that comprise at least one chiral group Sp*, MG* and/or R* as given in formula III.

Preferably the non-polymerizable chiral mesogenic compounds are selected of formula VI $$R^1\text{—}MG^1\text{—}G^2\text{—}MG^2\text{—}R^2 \qquad \text{VI}$$

wherein $MG^1$ and $MG^2$ each independently have one of the meanings of MG in formula II, $R^1$ and $R^2$ are each independently halogen, cyano or an optionally halogenated alkyl, alkenyl, alkoxy or alkanoyl group with 1 to 12 C atoms, and $G^2$ has the meaning of formula II*B. Very preferably $G^2$ is a chiral bivalent structure element based on a sugar molecule.

In another preferred embodiment of the present invention the chiral non-polymerizable compounds are selected from the following formulae

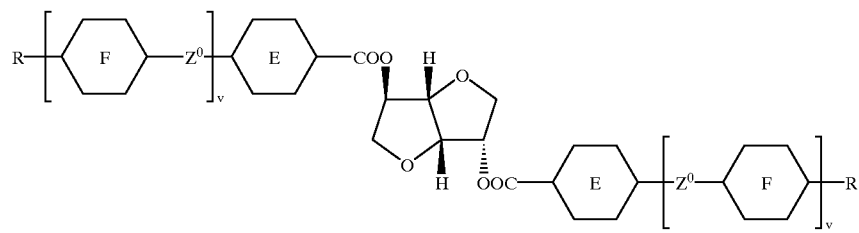
VIa

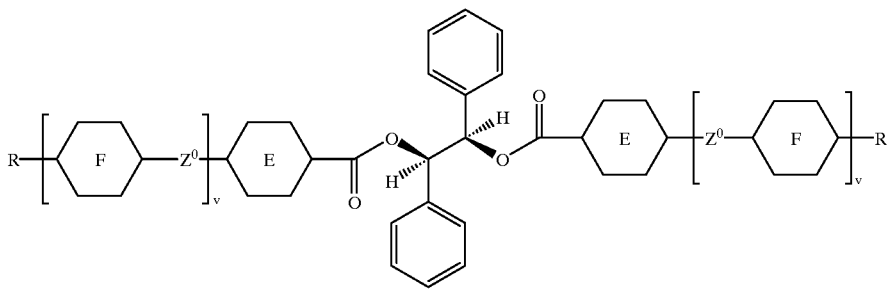

VIb wherein E and F are each independently 1,4-phenylene or trans-1,4-cyclohexylene, v is 0 or 1, $Z^0$ is —COO—, —OCO—, —CH$_2$CH$_2$— or a single bond, and R is alkyl, alkoxy or alkanoyl with 1 to 12 C atoms.

The compounds of formula VIa and their synthesis are described in the International Application WO 98/00428, the entire disclosure of which is incorporated into this application by way of reference.

Preferred embodiments of the invention relate to a reflective polarizer as described in the foregoing and the following that is obtainable by copolymerization of one of the following mixtures of a chiral polymerizable mesogenic material:

I) A mixture essentially consisting of
- a1) 10 to 85%, preferably 15 to 70%, in particular 20 to 60% by weight of at least one achiral polymerizable mesogenic compound according to formula I having one polymerizable group,
- a2) 0 to 70%, preferably 0 to 55%, in particular 0 to 40% by weight of at least one achiral polymerizable mesogenic compound according to formula I having two or more polymerizable groups,
- b1) 5 to 75%, preferably 10 to 65%, in particular 15 to 60% by weight of at least one chiral polymerizable mesogenic compound according to formula III having one polymerizable group,
- c) 0.01 to 5% by weight of a photoinitiator.

II) A mixture essentially consisting of
- a1) 10 to 85%, preferably 15 to 75%, in particular 20 to 65% by weight of at least one achiral polymerizable mesogenic compound having one polymerizable group,
- a2) 0 to 70%, preferably 0 to 55%, in particular 0 to 40% by weight of at least one achiral polymerizable mesogenic compound having two or more polymerizable groups,
- b2) 0.1 to 15%, preferably 0.2 to 10%, in particular 0.5 to 5% by weight of one or more chiral non-polymerizable compounds of formula VI,
- c) 0.01 to 5% by weight of a photoinitiator.

and optionally also comprising component b1) in the concentration ranges as described above.

Mixtures according to these particularly preferred embodiments are preferred that comprise
- one to five, in particular one to three compounds of component a1) and one or two compounds of component a2).
- two to six, in particular two to four different compounds of component a1) and no compounds of component a2).
- 2 to 70%, preferably 3 to 50%, in particular 5 to 35% by weight of at least one non-mesogenic compound having two or more polymerizable groups in addition or alternatively to component a2).
- one or two compounds of formula III having two polymerizable groups in addition or alternatively to the components a2) and/or b1).
- less than 10% by weight, very especially preferably none of the compounds having two or more polymerizable groups.
- no chiral polymerizable compound.
- 0.1 to 20%, preferably 0.2 to 10%, in particular 0.5 to 5% by weight of at least one non-polymerizable chiral compound, like e.g. a chiral dopant, that can also be mesogenic, alternatively or in addition to the components b1) and b2).

In the mixtures comprising two or more different compounds of formula I and IIII having one polymerizable group, preferably each of the compounds is different in at least one of the groups P, Sp, X, MG, Sp*, MG*, R or R* from each other of the compounds of the same component.

The polymerizable compounds of formula I and III in the mixtures according to the preferred embodiments described above are preferably selected of the preferred formulae Ia to Ik and IIIa to IIIm.

According to the above described process of preparing an inventive reflective polarizer, a mixture of a chiral polymerizable mesogenic material is coated on a substrate or between two substrates, aligned into a uniform planar orientation and cured by exposure to heat or actinic radiation in the presence of an initiator.

A detailed description of this method can be found e.g. in D. J. Broer et al., Makromol. Chem. 190, pp. 2255 ff. (1989).

As substrates for example a glass or quarz sheet as well as plastic films or sheets can be used.

Isotropic or birefringent substrates can be used. In case the substrate is not removed from the polymerized film after polymerization, preferably isotropic substrates are used.

In particular for mass production it is suitable to use plastic films as substrates, like e.g. polyester films such as polyethylene-terephthalate (PET), polyvinylalcohol (PVA), polycarbonate (PC), di- or triacetylcellulose (DAC/TAC). As a birefringent substrate for example an uniaxially stretched plastic film can be used. Preferably at least one substrate is a plastic substrate, especially preferably a PET film or a TAC film. PET films are commercially available e.g. from ICI Corp. under the trade name Melinex.

The substrates can be removed after polymerization or not. At least one substrate has to be transmissive for the actinic radiation used for the polymerization.

The polymerizable mesogenic material is coated on the substrate or between the substrates in form of a thin layer. This can be done by conventional techniques that are known to the skilled in the art.

It is also possible to dissolve the polymerizable mesogenic material in a suitable solvent. This solution is then coated onto the substrate and the solvent is evaporated off before curing.

For this purpose, for example standard organic solvents can be used, such as ketones like e.g. methyl ethyl ketone or cyclohexanone, aromatic solvents like e.g. toluene or xylene, halogenated hydrocarbons like e.g. di- or trichloromethane, or alcohols such as e.g. methanol, ethanol or isopropyl alcohol. It is also possible to use binary, ternary or higher mixtures of the above solvents.

The coated layer of the mixture of the chiral polymerizable mesogenic material is aligned to give a planar orientation, i.e. wherein the axis of the molecular helix extends transversely to the layer.

A planar orientation can be achieved for example by shearing the material, e.g. by means of a doctor blade. It is also possible to apply an alignment layer, for example a layer of rubbed polyimide or sputtered $SiO_x$, on top of at least one of the substrates or on top of the barrier layers covering the substrates.

Planar alignment can further achieved with materials and means that are well-known to the expert, and are described for example in J. Cognard, Mol. Cryst. Liq. Cryst. 78, Supplement 1, 1–77 (1981).

In another preferred embodiment, the shearing caused by putting together two substrates is sufficient to give good alignment.

Polymerization of the polymerizable material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. Another possible source for actinic radiation is a laser, like e.g. a UV laser, an IR laser or a visible laser.

With the inventive method, it is possible to produce reflective polarizers with asymmetrical pitch structure and a broad bandwidth even with very short curing times that may be reduced to less than 1 minute. This makes the inventive method particularly suitable for mass production. Curing times of 10 minutes or less, in particular of 5 minutes or less, very preferably of 2 minutes or less are preferred. For mass production, curing times of 90 seconds or less, in particular 60 seconds or less, very preferably 30 seconds or less are preferred.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decoposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The chiral polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

In some cases a second substrate is used that does not only aid alignment of the polymerizable composition, but also excludes oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

In a preferred embodiment of the invention the polymerization of the polymerizable composition is carried out under an atmosphere of inert gas, preferably under a nitrogen atmosphere.

In addition to the polymerization initiators mentioned above, the polymerizable mixture may also comprise one or more other suitable components such as, for example, catalysts, stabilizers, chain-transfer agents, co-reacting monomers or surface-active compounds.

In a preferred embodiment of the invention, the polymerizable mixture comprises a stabilizer that is used to prevent undesired spontaneous polymerization for example during storage of the composition. As stabilizers in principal all compounds can be used that are known to the skilled in the art for this purpose. These compounds are commercially available in a broad variety. Typical examples for stabilizers are 4-ethoxyphenol or butylated hydroxytoluene (BHT). The amount of the stabilizer in the polymerizable mixture is preferably from 1 to 1000 ppm, especially preferably from 10 to 500 ppm.

Other additives, like e.g. chain transfer agents, can also be added to the polymerizable mixture in order to modify the physical properties of the resulting polymer film. For example when adding a chain transfer agent to the polymerizable mixture, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the polymerizable mixture comprises 0.01 to 15%, in particular 0.1 to 10%, very preferably 0.5 to 5% of a chain transfer agent. The polymer films according to this preferred embodiment show especially good adhesion to a substrate, in particular to a plastic film, like e.g. a TAC film. Furthermore, by using polymerizable mesogenic mixtures comprising a chain transfer agent a reflective polarizer with increased bandwidth can be obtained.

As a chain transfer agent for example monofunctional thiol compounds like e.g. dodecane thiol or multifunctional thiol compounds like e.g. trimethylpropane tri(3-mercaptopropionate) can be used.

To obtain polymer films with the desired helically twisted planar molecular structure with a good orientation the polymerization has to be carried out in the liquid crystal phase of the polymerizable mesogenic mixture. Therefore preferably polymerizable mesogenic mixtures with low melting points and broad liquid crystal phase ranges are preferred. The use of such mixtures allows to reduce the polymerization temperature, which makes the polymerization process easier and is of importance especially for mass production. Polymerization temperatures below 120° C. are preferred. Especially preferred are temperatures below 90° C.

The thickness of the polymer film influences the bandwidth of the reflective polarizer. Depending on the band position and the bandwidth, the thickness is preferably from 5 to 30 μm. For bandwidths of about 300 nm or more, a thickness of 10 to 20 μm is particularly preferred.

In a preferred embodiment the polymerizable mixture additionally contains a dye having an absorption maximum adjusted to the wavelength of the actinic radiation used for polymerization. Preferably, a dye is used whose absorption maximum lies outside the operation wavelength range of the reflective polarizer in order to exclude undesired absorptions during the use of the polarizer.

By adding a dye to the polymerizable mixture, it is possible to further enhance the formation of the pitch gradient throughout the polarizer film, and thus to create e.g. an asymmetrical pitch structure and/or to broaden the bandwidth. Furthermore, by adding a dye it is possible e.g. to shift the central wavelength of the reflection spectrum of the reflective polarizer towards longer wavelengths.

In another preferred embodiment of the invention the polymerizable mixture contains no dye.

It is also possible, in order to increase crosslinking of the polymers, to add up to 20% of a non mesogenic compound with two or more polymerizable functional groups to the polymerizable mixture alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the inventive reflective polarizer.

Apart from the methods and conditions described above, an inventive broadband reflective polarizer can be prepared as described in the International Application WO 97/35219.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European application No9711651.8, filed Sep. 17, 1997 is hereby incorporated by reference.

The following abbreviations are used to illustrate the liquid crystalline phase behavior of the compounds:

K=crystalline; N=nematic; S=smectic; Ch=cholesteric; I=isotropic. The numbers between these symbols indicate the phase transition temperatures in degree Celsius.

EXAMPLES

Example 1—Comparison Example

Preparation of a reflective polarizer according to prior art

The following polymerizable mixture is formulated

| | |
|---|---|
| compound (1) | 65.0% |
| compound (2) | 26.0% |
| compound (3) | 7.5% |
| compound (4) | 0.5% |
| photoinitiator | 1.0% |

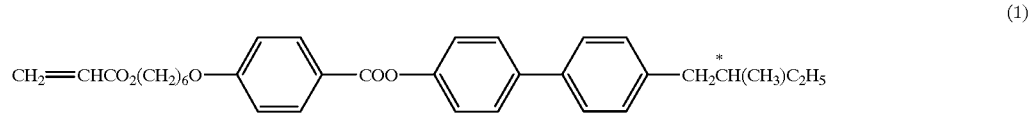

(1)

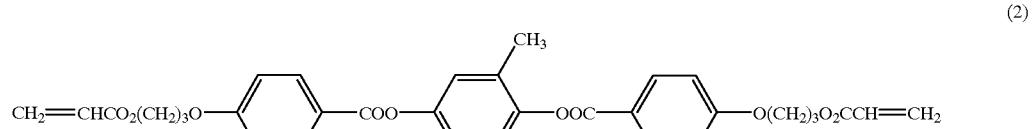

(2)

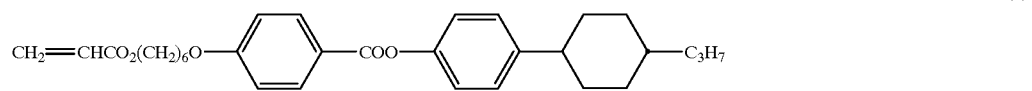

(3)

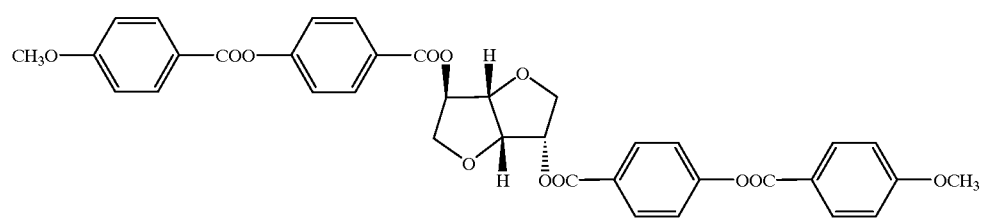

(4)

Compound (1) can be prepared as described in the DE 195,04,224. Compound (2) can be prepared in analogy to the methods described in WO 93/22397. The synthesis of compound (3) is described in the GB 2,280,445 A. The synthesis of compound (4) is described in the International Application WO 98/00428. The photoinitiator is consisting of 40% Lucirin TPO (triacylphosphin-oxide) available from BASF and 60% Irgacure 2959 available from Ciba Geigy.

The mixture is coated as a film of 15 μm thickness between two PET substrates (Melinex 401, 100 μm thickness) and polymerized under UV light (irradiance of 0.28 mW/cm$^2$) at a temperature of 85° C. for 5 minutes to give a polymer film.

The transmission spectrum of the polymer film is measured and is shown in FIG. 3.1, with a) indicating the transmitted and b) the reflected light. The film exhibits a reflection waveband between 470 nm and 730 nm and is thus suitable as a broadband reflective polarizer.

A small sample (35×35 mm) of the reflective polarizer film is placed on a meander type backlight (available from FPD) together with a quarter wave foil (QWF), a compensating layer and a linear polarizer (LLC2 9261, available from Sanritz). The luminance at various viewing angles is then measured in the horizontal plane for this assembly as shown in FIG. 2.1 (setup A), wherein 20 denotes the backlight, 21 the reflective polarizer, 22 the QWF, 23 the compensation film, 24 the linear polarizer and 25 denotes a light detector. The measurement is repeated for an assembly as shown in FIG. 2.2 (setup B) comprising only the backlight 20, the linear polarizer 24 and the light detector 25.

The results are shown in FIG. 3.2, where curve A depicts the luminance measured for setup A comprising the inventive reflective polarizer and curve B depicts the luminance measured for setup B comprising the linear polarizer alone.

It can be seen from FIG. 3.2 that at small viewing angles the luminance of setup A comprising the reflective polarizer is higher than that of setup B with the linear polarizer, whereas at angles larger the luminance of setup B is higher. The cross-over angle is 43°.

Example 2

Preparation of a reflective polarizer film between two different substrates

The polymerizable mixture of example 1 is coated as a film of 15 μm thickness between one PET substrate as used in example 1 and one TAC substrate (Triphan 91). The sample was polymerized under UV light (irradiance of 0.31 mW/cm$^2$) at a temperature of 85° C. for 1 minute to give a polymer film which can be used as a reflective polarizer.

The transmission spectrum of the polymer film is measured and is shown in FIG. 4.1 with a) indicating the transmitted and b) the reflected light. The film exhibits a wide reflection waveband between 380 nm and 830 nm which is considerably larger than that of the film of example 1.

The luminance of a small sample (35×35 mm) of the film is measured as described in example 1 in a setup A together with a meander type backlight (from FPD), a quarter wave foil, a compensating layer and a linear polarizer (LLC2 9261 from Sanritz), and the measurment repeated for setup B comprising only the backlight and the linear polarizer. The results are shown in FIG. 4.2, wherein curve A depicts the luminance for setup A and curve B depicts the luminance for setup B.

As can be seen from FIG. 4.2, the luminance of setup A comprising the reflective polarizer film is higher than that of setup B with the linear polarizer film over the whole range of observed viewing angles. A cross-over angle cannot be observed up to 60°.

Example 3

Preparation of a reflective polarizer film between two different substrates, one of which is coated with an oxygen barrier layer The polymerizable mixture of example 1 is coated as a film of 15 μm thickness between one PET substrate as used in example 1 and one PET substrate coated with a 5 μm thick layer of PVA (with a molecular weight $M_w$ of 120,000). The sample was polymerized under UV light (0.14 mW/cm$^2$) at 80° C. for 30 seconds to give a polymer film which can be used as a reflective polarizer.

The transmission spectrum of the polymer film is measured and is shown in FIG. 5.1, with a) indicating the transmitted and b) the reflected light. The film exhibits a wide reflection waveband between 390 nm and 740 nm that is considerably larger compared to the film of example 1.

The luminance of a small sample (35×35 mm) of the film is measured as described in example 1 in a setup A together with a meander type backlight (from FPD), a quarter wave foil, a compensating layer and a linear polarizer (LLC2 9261 from Sanritz), and the measurement repeated for setup B comprising only the backlight and the linear polarizer. The results are shown in FIG. 5.2, wherein curve A depicts the luminance for setup A and curve B depicts the luminance for setup B.

As can be seen from FIG. 5.2, the luminance of setup A comprising the reflective polarizer film is higher than that of setup B with the linear polarizer film over the whole range of observed viewing angles. A cross-over angle cannot be observed up to 60°.

Example 4

Preparation of a reflective polarizer film between two substrates, one of which is coated with an oxygen barrier layer The polymerizable mixture of example 1 is coated as a film of approximately 18 μm thickness between one PET substrate as used in example 1 and one PET substrate coated with a thin layer (<1 nm) of $Al_2O_3$. The sample was polymerized under UV light (0.2 mW/cm$^2$) at 90° C. for about 1 minute to give a polymer film which can be used as a reflective polarizer.

The transmission spectrum of the polymer film is measured and is shown in FIG. 6.1, with a) indicating the transmitted and b) the reflected light. The film exhibits a wide reflection waveband between 450 nm and 730 nm, which is larger than that of the film of example 1.

The luminance of a small sample (35×35 mm) of the film is measured as described in example 1 in a setup A together with a meander type backlight (available from Tamadenki), a quarter wave foil, a compensating layer and a linear polarizer (LLC2 9261 from Sanritz), and the measurement repeated for setup B comprising only the backlight and the linear polarizer. The results are shown in FIG. 6.2, wherein curve A depicts the luminance for setup A and curve B depicts the luminance for setup B.

As can be seen from FIG. 6.2, the luminance of setup A comprising the reflective polarizer film is higher than that of setup B with the linear polarizer film over nearly the entire range of observed viewing angles. A cross-over angle cannot be observed up to +60° and −55° respectively.

Example 5

Preparation of a reflective polarizer film between two substrates, one of which is coated with an oxygen barrier layer To the polymerizable mixture of example 1 1% of a UV dye (comercially available Tinuvin dye) is added. The mixture is then coated and polymerized between one PET substrate and one PET substrate coated Al$_2$O$_3$ as described in example 4.

The transmission spectrum of the polymer film is measured and is shown in FIG. 7.1, with a) indicating the transmitted and b) the reflected light. The film exhibits a wide reflection waveband between 470 nm and 770 nm, which is larger than that of the film of example 1.

The luminance of a small sample (35×35 mm) of the film is measured as described in example 1 in a setup A together with a meander type backlight (from Tamadenki), a quarter wave foil, a compensating layer and a linear polarizer (LLC2 9261 from Sanritz), and the measurement repeated for a setup B comprising only the backlight and the linear polarizer. The results are shown in FIG. 7.2, wherein curve A depicts the luminance for setup A and curve B depicts the luminance for setup B.

As can be seen from FIG. 7.2, the luminance of setup A comprising the reflective polarizer film is higher than that of setup B with the linear polarizer film over nearly the entire range of observed viewing angles. A cross-over angle cannot be observed up to +60° and –55° respectively.

Example 6

Preparation of a reflective polarizer film between two substrates, one of which is coated with a layer of anisotropic polymer The polymerizable mixture of example 1 is coated as a film of approximately 18 μm thickness between one PET substrate as used in example 1 and one PET substrate coated with a 5 μm thick layer of a homeotropically aligned nematic polymer film, which has been obtained from a nematic polymerizable material as described below. The sample was polymerized under UV light (0.2 mW/cm$^2$) at 90° C. for about 1 minute to give a polymer film which can be used as a reflective polarizer.

The transmission spectrum of the polymer film is measured and is shown in FIG. 8.1, with a) indicating the transmitted and b) the reflected light. The film exhibits a wide reflection waveband between 450 nm and 730 nm, which is larger than that of the film of example 1.

The luminance of a small sample (35×35 mm) of the film is measured as described in example 1 in a setup A together with a double edge lit backlight (available from Optrex), a quarter wave foil, a compensating layer and a linear polarizer (LLC2 9261 from Sanritz), and the measurement repeated for a setup B comprising only the backlight and the linear polarizer. The results are shown in FIG. 8.2, wherein curve A depicts the luminance for setup A and curve B depicts the luminance for setup B.

As can be seen from FIG. 8.2, the luminance of setup A comprising the reflective polarizer film is higher than that of setup B with the linear polarizer film over nearly the entire range of observed viewing angles. A cross-over angle cannot be observed up to 60°.

The homeotropically aligned nematic polymer film used as coating on one of the substrates in Example 7 was prepared as follows: A polymerizable mesogenic mixture comprising

| | |
|---|---|
| compound (2) | 40% |
| compound (3) | 46% |

-continued

| | |
|---|---|
| compound (5) | 10% |
| Irgacure 907 | 4% |

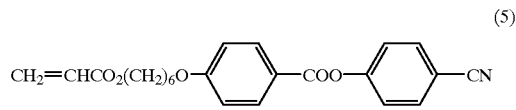

(Irgacure is a photoinitiator commercially available from Ciba Geigy AG, compound (5) can be prepared in analogy to compound (1)) was coated from a solution of toluene/xylene/propan-2-ol (30% solids content) as a thin film of approximately 20 μm thickness onto an aluminised PET film. The solvent was evaporated and the resultant, approximately 6 μm film of polymerizable mesogenic mixture was cured with a mercury lamp at 40° C.

In comparison to the reflective polarizer of example 1, which has been prepared according to a prior art method, the reflective polarizers of examples 2 to 7 which have been prepared according to the inventive method exhibit improved properties, like a broader bandwidth and an improved off-axis luminance when being put on a backlight, without the appearance of a cross-over angle.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A broadband reflective polarizer comprising a layer of a polymerized mesogenic material exhibiting a helically twisted molecular structure with planar alignment, said reflective polarizer being obtained by a process wherein a mixture of a chiral polymerizable mesogenic material comprising
   a) at least one achiral polymerizable mesogenic compound,
   b) at least one chiral compound which is optionally polymerizable and/or mesogenic, and
   c) a polymerization initiator,
is coated on a substrate or between two substrates in form of a layer, aligned in a planar orientation so that the axis of the molecular helix extends transversely to the layer, and polymerized by exposure to heat or actinic radiation, and optionally the substrates are removed from the polymerized material, wherein
   said polymerizable material is coated and polymerized between two different substrates, and/or
   at least one substrate comprises a barrier layer on the surface adjacent to the layer of said polymerizable material.

2. A reflective polarizer according to claim 1, wherein at least one of said substrates is a plastic film.

3. A reflective polarizer according to claim 1, wherein two substrates are used that exhibit different polymerization inhibition characteristics.

4. A reflective polarizer according to claim 1, wherein at least one of the substrates comprises an oxygen barrier layer.

5. A reflective polarizer according to claim 4, wherein said oxygen barrier layer is polyvinylalcohol (PVA).

6. A reflective polarizer according to claim 4, wherein the thickness of said oxygen barrier layer is from 0.5 μm to 20 μm, in particular from 1 to 10 μm.

7. A reflective polarizer according to claim 1, having a pitch of the molecular helix varying asymmetrically in a direction normal to the plane of the polarizer.

8. A reflective polarizer according to claim 1, with a reflection bandwidth of at least 200 nm.

9. A reflective polarizer according to claim 1, wherein the reflection characteristics of said reflective polarizer including the central wavelength, the shape or the bandwidth of the reflected spectrum, or the viewing angle dependence of these characteristics are controlled with two different substrates and/or of a barrier layer being coated onto at least one of said substrates.

10. A liquid crystal display device comprising a liquid crystal cell and a reflective polarizer according to claim 1, optionally further comprising at least one of the following components I) an optical retardation film with a retardation which is approximately 0.25 times the wavelength of the band reflected by the reflective polarizer, p1 II) a linear polarizer, or III) a compensation film comprising a layer of an anisotropic polymer material with a homeotropic or tilted homeotropic orientation.

11. A process for the preparation of a broadband reflective polarizer comprising a layer of a polymerized mesogenic material exhibiting a helically twisted molecular structure with planar alignment, said process comprising coating a mixture of a chiral polymerizing mesogenic material comprising a) at least one achiral polymerizing mesogenic compound, b) at least one chiral compound which is optionally polymerizing and/or mesogenic, and c) a polymerizing initiator, on a substrate comprising a barrier layer or between two different substrates in form of a layer, aligned in a planar orientation so that the axis of the molecular helix extends transversely to the layer, and polymerizing by exposure to heat or actinic radiation, and optionally removing the substrates from the polymerizing material.

* * * * *